United States Patent [19]

Holliger

[11] Patent Number: 4,623,720

[45] Date of Patent: Nov. 18, 1986

[54] 1:2 METAL COMPLEXES OF AZO COMPOUNDS HAVING A CENTRAL SUBSTITUTED PHENYLENESULFONYLAMINOPHENYLENE RADICAL

[75] Inventor: Herbert Holliger, Allschwil, Switzerland

[73] Assignee: Sandoz Ltd., Basel, Switzerland

[21] Appl. No.: 270,571

[22] Filed: Jun. 4, 1981

Related U.S. Application Data

[63] Continuation-in-part of Ser. No. 129,601, Mar. 12, 1980, abandoned.

[30] Foreign Application Priority Data

Mar. 15, 1979 [CH] Switzerland ............... 2455/79

[51] Int. Cl.$^4$ .............. C09B 45/24; C09B 45/26; C09B 45/28; C09B 45/30
[52] U.S. Cl. ................ 534/700; 534/704; 534/709; 534/717; 534/718; 534/740; 534/759; 534/764; 534/767; 534/819
[58] Field of Search .................. 260/145 B, 147; 534/700, 704, 709, 717, 718

[56] References Cited

U.S. PATENT DOCUMENTS

| | | | |
|---|---|---|---|
| 2,152,007 | 3/1939 | Winkeler et al. ............... | 260/147 X |
| 2,193,438 | 3/1940 | Taube et al. .................... | 260/147 X |
| 2,384,419 | 9/1945 | Fleischhauer et al. ......... | 260/147 X |
| 2,861,985 | 11/1958 | Ischer et al. ................... | 260/147 |
| 2,886,562 | 5/1959 | Taube et al. .................... | 260/147 X |
| 2,900,379 | 8/1959 | Bockmann et al. ............. | 260/147 X |
| 3,467,645 | 9/1969 | Keller et al. .................... | 260/147 X |

FOREIGN PATENT DOCUMENTS

| | | | |
|---|---|---|---|
| 631460 | 11/1961 | Canada ........................... | 260/145 B |
| 1544464 | 5/1971 | Fed. Rep. of Germany ...... | 260/147 |
| 2254835 | 5/1974 | Fed. Rep. of Germany ...... | 260/169 |
| 2416551 | 10/1975 | Fed. Rep. of Germany ...... | 260/169 |
| 2416670 | 10/1975 | Fed. Rep. of Germany ...... | 260/169 |
| 2415690 | 10/1975 | Fed. Rep. of Germany ...... | 260/169 |
| 2440404 | 3/1976 | Fed. Rep. of Germany ...... | 260/169 |
| 567550 | 10/1975 | Switzerland ..................... | 260/147 |
| 402920 | 12/1933 | United Kingdom ............. | 260/177 |
| 502420 | 3/1939 | United Kingdom ............. | 260/177 |
| 1145655 | 3/1969 | United Kingdom ............. | 260/147 |
| 1485056 | 12/1973 | United Kingdom ............. | 260/177 |

Primary Examiner—Floyd D. Higel
Attorney, Agent, or Firm—Gerald D. Sharkin; Richard E. Vila; Melvyn M. Kassenoff

[57] ABSTRACT

1:1 and 1:2 metal complexes comprising the unit of the formula

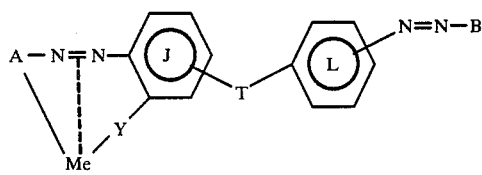

wherein

A and B, independently, are radicals of diazo or coupling components, with the proviso that when one of A and B is a radical of a diazo component, the other is a radical of a coupling component, T is $-SO_2N(R_1)-$ or $-N(R_1)SO_2-$, wherein $R_1$ is hydrogen, $C_{1-4}$alkyl, $C_{1-4}$alkyl substituted by phenyl or carboxy or $C_{2-4}$alkyl substituted in the $\beta-$, $\gamma-$ or $\delta-$position by phenoxy, $C_{1-4}$alkyl, chloro or hydroxy, with the proviso that T is $-N(R_1)SO_2-$ when A is the radical of a diazo component and T is $-SO_2N(R_1)-$ when B is the radical of a diazo component, Y is $-O-$ or $-COO-$ when A is the radical of coupling component and is $-O-$ or $-NH-$ when A is the radical of a diazo component, Me is a divalent or trivalent complex-forming metal ion, and rings J may bear one further substituent and ring L may bear one or two further substituents, which complexes contain at least one water-solubilizing group and are useful as dyes for the dyeing and printing of textile and non-textile substrates dyeable with anionic dyes, for example, natural and regenerated cellulose, natural and synthetic polyamides, polypropylene modified to contain basic groups, polyurethanes, anodized aluminum and paper. Also metal-free, mono-metallizable compounds useful the preparation of the 1:1 and 1:2 metal complexes.

52 Claims, No Drawings

1:2 METAL COMPLEXES OF AZO COMPOUNDS HAVING A CENTRAL SUBSTITUTED PHENYLENESULFONYLAMINOPHENYLENE RADICAL

This application is a continuation-in-part of application Ser. No. 129,601, filed Mar. 12, 1980 and now abandoned.

The present invention relates to metal complexes, their preparation and use as dyestuffs.

More particularly, the present invention provides metal complexes comprising the unit of formula I

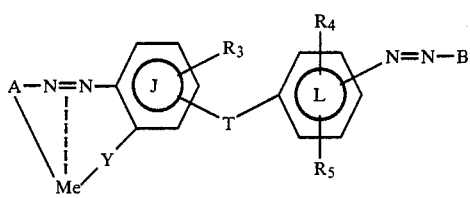

in which
- A is the radical of a metallized diazo or coupling component,
- B is the radical of a non-metallized diazo or coupling component, with the proviso that when A is the radical of a diazo component, B is the radical of a coupling component,
- T is $-SO_2N(R_1)-$ or $-N(R_1)SO_2-$, with the proviso that when A is the radical of a diazo component, T is $-N(R_1)SO_2-$—i.e. the N-atom is bound to ring J, and when B is the radical of a diazo component, T is $-SO_2N(R_1)-$,
- Y is $-O-$ or $-COO-$ when A is the radical of a coupling component and is $-O-$ or $-NH-$ when A is the radical of a diazo component,
- $R_1$ is hydrogen, $C_{1-4}$alkyl optionally substituted by phenyl or carboxy or $C_{2-4}$alkyl substituted in the 2-, 3- or 4-position by phenoxy, $C_{1-4}$alkoxy, chlorine or hydroxy,
- $R_3$ is hydrogen, chlorine, bromine, $C_{1-4}$alkyl, $C_{1-4}$alkoxy, sulfo, nitro or cyano when T is $-N(R_1)SO_2-$ and A is the radical of a coupling component and is otherwise hydrogen, chlorine, bromine, $C_{1-4}$alkyl or $C_{1-4}$alkoxy,
- $R_4$ is hydrogen or carboxy when T is $-SO_2N(R_1)-$ and B is the radical of a coupling component, is hydroxy or amino when T is $-SO_2N(R_1)-$ and B is the radical of a diazo component and is hydrogen, carboxy or $C_{1-4}$alkoxy when T is $-N(R_1)SO_2-$
- $R_5$ is hydrogen, chlorine, bromine, $C_{1-4}$alkyl, $C_{1-4}$alkoxy, sulfo, nitro or cyano when T is $-SO_2N(R_1)-$ and B is the radical of a coupling component and is otherwise hydrogen, chlorine, bromine, $C_{1-4}$alkyl or $C_{1-4}$alkoxy, and
- Me is a divalent or trivalent complex-forming metal atom, which metal complexes are 1:1 metal complexes or 1:2 metal complexes and contain at least one water-solubilizing group.

By valency of the metal is meant the formal positive charge on the metal ion.

It will be appreciated that the 1:2 metal complexes may be symmetrical or asymmetrical. Preferably, the second azo complex component i.e., azo unit, is of the same general formula as that given above, with the substituents thereon being the same or different.

It will also be appreciated that when B contains a metallizable group (e.g., an $-NH_2$ or $-OH$ group) in a position ortho to the azo radical linking it to ring L, $R_4$ is hydrogen when it is ortho to the azo radical and $R_5$ is other than $C_{1-4}$alkoxy when it is ortho to the azo radical.

The 1:1 metal complexes of formula I are of the formula

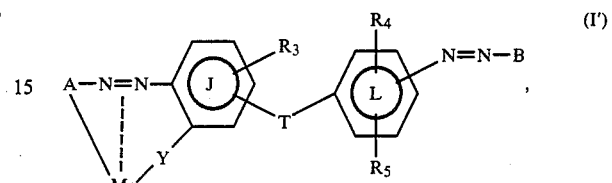

wherein
$Me_1$ is a divalent 1:1 metal complex-forming metal ion, and
each of the other variables is as defined above,
and the 1:2 metal complexes of formula I are of the formula

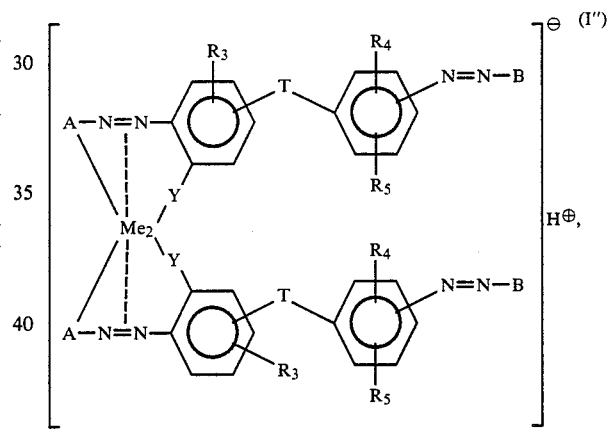

wherein
$Me_2$ is a trivalent 1:2 metal complex-forming metal ion, and
each of the other variables is as defined above.

Representative groups of metal complexes are those wherein (1) each A is independently the radical of a metallized coupling component, and each B is independently the radical of a non-metallized coupling component, (2) each A is independently the radical of a metallized coupling component, each B is independently the radical of a non-metallized diazo component, and each T is independently $-SO_2N(R_1)-$, and (3) each A is independently the radical of a metallized diazo component, each B is independently the radical of a non-metallized coupling component, and each T is independently $-N(R_1)SO_2-$.

Preferred complexes are those comprising the unit of formula I in which A is $G_x-X$, where $G_x-X$ is the radical of a metallized diazo or coupling component, X being bound to the C-atom vicinal to the azo group, and X is $-O-$, $-NH-$ or $-COO-$, with the proviso that when $G_x-X$ is the radical of a metallized diazo component, X is $-O-$ or $-COO-$.

The preferred water-solubilizing groups are carboxy and sulpho groups and such groups may be in free acid or salt form. Preferred complexes are those which contain at least one sulpho group, especially those which contain a maximum of 3 sulpho groups, more especially 1 or 2 sulpho groups, per unit of formula I.

The cations of the salt form of the sulpho and carboxy groups may be any of those non-chromophoric cations conventional for anionic dyestuffs, especially ammonium and alkali metal cations. The most preferred cations are sodium, potassium and lithium, especially sodium. When the 1:2 complex is in salt form the cation balancing the negative charge on the metal may be hydrogen or one of the cations of the salt form.

The diazo component radicals as A, $G_x$—X or B may be any of those common in anionic metal complex azo dyes. Preferred diazo component radicals are those which are derived from diazo components of the aminonaphthalene or aminobenzene series, especially those which contain a maximum of two aromatic nuclei. More preferably, any diazo component radical as B is of formula ($c_1$), ($c_2$), ($c_3$) or ($c_4$)

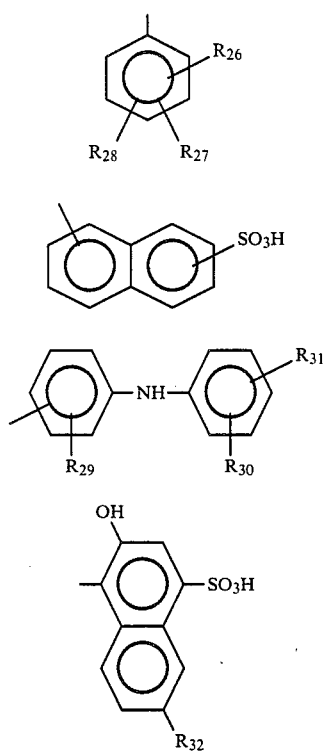

in which
R$_{26}$ is hydrogen, methoxy, carboxy or hydroxy,
R$_{27}$ is hydrogen, chlorine, methyl, methoxy, nitro or sulpho,
R$_{28}$ is hydrogen, chlorine, methyl, cyano, carboxy, nitro, sulpho, —SO$_2$NW$_3$W$_4$ or acetamido,
R$_{29}$ is hydrogen, chlorine, methyl, methoxy or sulpho,
R$_{30}$ is hydrogen or nitro,
R$_{31}$ is hydrogen, nitro or sulpho,
R$_{32}$ is hydrogen or nitro, and
each of W$_3$ and W$_4$, independently, is hydrogen, C$_{1-4}$alkyl or C$_{2-4}$alkyl substituted in the 2-, 3- or 4-position by hydroxy or C$_{1-4}$alkoxy.

Any A or $G_x$—X— as a diazo component radical is preferably ($c_1$) where R$_{26}$ is ortho to the azo group and is —O— or —COO— or ($c_4$) with the hydroxy group as —O—.

The coupling components for AH, $G_x$—XH and/or BH may be any of those common in the chemistry of anionic metal complex azo dyes. Suitable coupling components include those of the aromatic carbocyclic or aromatic heterocyclic series or those of the non-cyclic series having an active methylene group. Preferred coupling components are those of the benzene, naphthalene, pyrazolone, 5-aminopyrazole, pyrimidone, oxyquinoline or pyridone series or acetoacetyl compounds (acetoacetic acid, acetoacetic acid ester and acetoacetic acid amide). Preferably, any aromatic coupling component contains a maximum of three, more preferably two, aromatic nuclei.

Preferably, each of AH, BH and $G_x$—XII is independently, when a coupling component, a compound of formula ($a_1$) to ($a_9$)

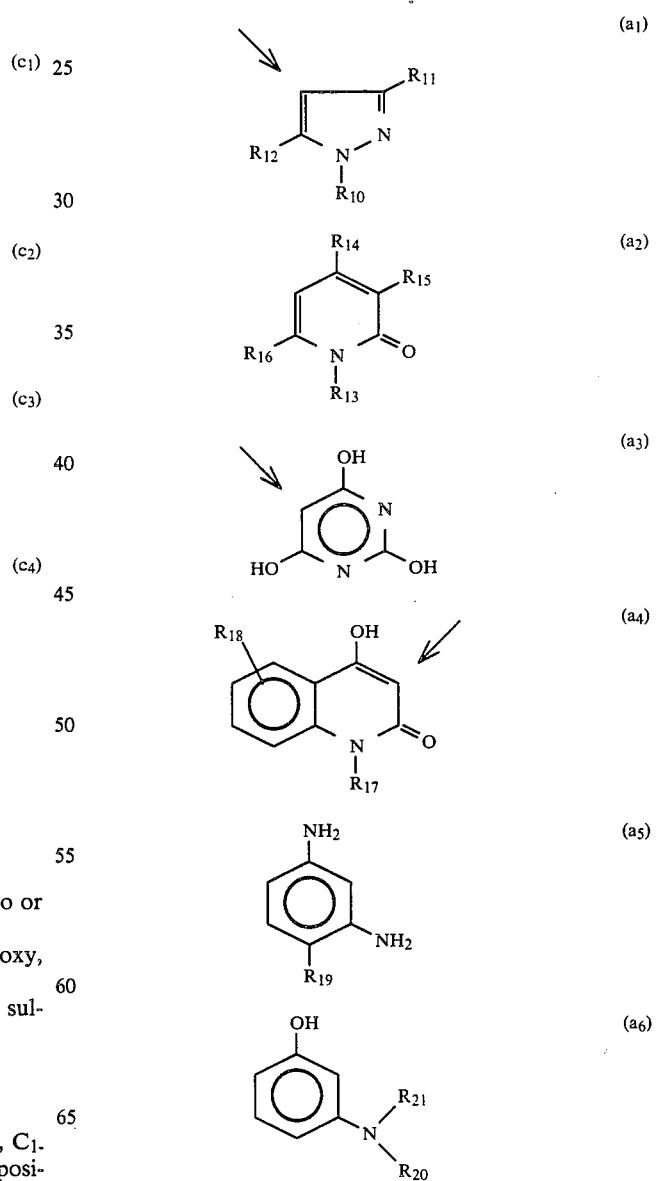

-continued

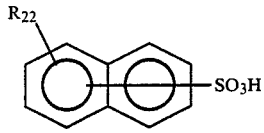
(a7)

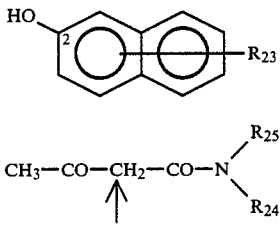
(a8)

$CH_3-CO-CH_2-CO-N\begin{smallmatrix}R_{25}\\R_{24}\end{smallmatrix}$ (a9)

in which
$R_{10}$ is hydrogen or $(b_1)$ or $(b_2)$

 $(b_1)$

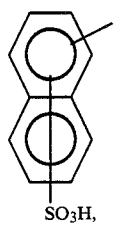 $(b_2)$ $W_1$ is hydrogen, chlorine, methyl, methoxy, cyano, nitro, carboxy, $-SO_2NW_3W_4$ or sulpho,
$W_2$ is hydrogen, chlorine, methyl, methoxy or carboxy,
$R_{11}$ is $C_{1-4}$alkyl, phenyl, carboxy or $-CONW_3W_4$,
$R_{12}$ is $-OH$ or $-NH_2$,
$R_{13}$ is hydrogen, $-NH_2$, phenylamino, $(b_1)$, $(b_2)$, $C_{1-8}$alkyl, $C_{6-9}$cycloalkyl or alkylcycloalkyl, carboxy-$C_{1-4}$alkyl or $C_{2-4}$alkyl substituted in the 2-, 3- or 4-position by hydroxy, methoxy, ethoxy, chlorine or sulpho,
$R_{14}$ is hydrogen, hydroxy, methyl, carboxy, phenyl or $-CH_2SO_3H$,
$R_{15}$ is hydrogen, carboxy, sulpho, acetyl or cyano,
$R_{16}$ is hydrogen, hydroxy or methyl, with the proviso that at least one of $R_{14}$ and $R_{16}$ is hydroxy,
$R_{17}$ is hydrogen or $C_{1-4}$alkyl,
$R_{18}$ is hydrogen or chlorine,
$R_{19}$ is hydrogen, methyl, methoxy, chlorine, carboxy or sulpho,
each of $R_{20}$ and $R_{21}$, independently, is hydrogen, $C_{1-4}$alkyl, carboxymethyl, 2-carboxyethyl or 2-hydroxyethyl,
$R_{22}$ is $-OH$ or $-NH_2$,
$R_{23}$ is hydrogen or carboxy,
$R_{24}$ is hydrogen or $C_{1-4}$alkyl, and
$R_{25}$ is $C_{1-8}$alkyl, $C_{6-9}$, cycloalkyl or alkylcycloalkyl, $(b_1)$ or $(b_2)$,
wherein the arrow indicates the coupling position, in those formulae which have no arrow coupling takes place in a position which is activated by a hydroxy or amino group, i.e. in a position ortho or para thereto, and where such group $(a_1)$ to $(a_g)$ signifies the coupling component from which $A-$ or $G_x-X$ is derived, a group XH ortho to the coupling position is bound to the metal atom.

More preferred complexes are those of formulae $I_a$ and $I_b$

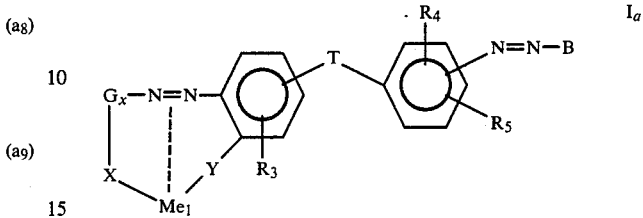 $I_a$ in which
$Me_1$ is a divalent metal atom, in particular nickel or copper, especially copper,
and $G_x-X$, B, Y, $R_3$, $R_4$, $R_5$ and T are as defined above, and

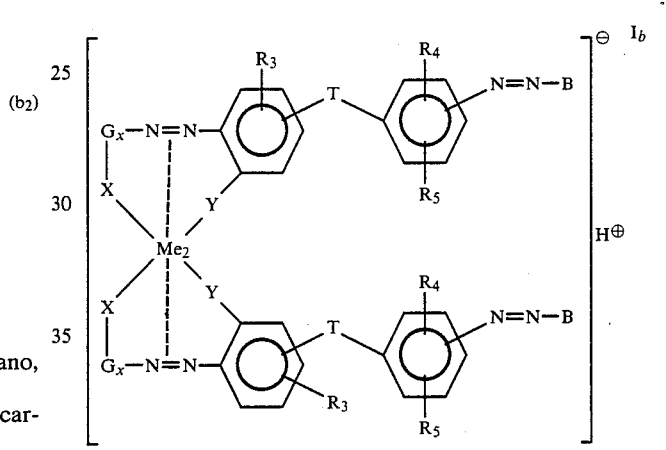 $I_b$ in which
each $G_x-X$, B, $R_3$, $R_4$, $R_5$, X, Y and T are as defined above and are the same or different, and
$Me_2$ is a trivalent metal, in particular iron, chromium or cobalt, preferably chromium or cobalt, especially cobalt,
which complexes are in free acid or salt form, especially alkali metal salt form. It will be appreciated that when the 1:2 complexes are in salt form, the H $\oplus$ shown outside the bracket may also be one of the cations of the sulpho and carboxy groups mentioned above.

Representative groups of metal complexes of formulae $I_a$ and $I_b$ are
(1) those wherein any water-solubilizing group is sulpho or carboxy,
(2) those of (1) wherein when any B is the radical of a non-metallized diazo component, it is independently a group of formula $(c_1)$, $(c_2)$, $(c_3)$ or $(c_4)$,
(3) those of (2) wherein each $R_{26}$ is independently hydrogen or hydroxy when in B and $-O-$ when in $G_x-X$, each $R_{27}$ is independently hydrogen, nitro or sulpho, and each $R_{28}$ is independently hydrogen, chloro, methyl or carboxy,
(4) those of (1) wherein when any B or $G_x-X$ is the radical of a coupling component, it is independently the radical of a coupling component selected from those of formulae $(a_1)-(a_9)$, (5) those of (4) wherein each B is independently the radical of a non-metallized coupling component, and each $G_x$—X is independently the radical of a coupling component, (6) those of (5) wherein each B and $G_x$—X is independently the radical of a coupling component of formula $(a_1)$, $(a_2)$, $(a_3)$, $(a_6)$, $(a_7)$ or $(a_8)$, (7) those of (6) wherein each B and $G_x$—X is independently the radical of a coupling component of formula $(a_1)$, $(a_2)$ or $(a_7)$, (8) those of (7) wherein each $R_{10}$ is independently $(b_1)$ wherein $W_1$ is hydrogen or sulpho, and $W_2$ is hydrogen, each $R_{11}$ is independently methyl or carboxy, each $R_{12}$ is hydroxy, each $R_{13}$ is independently $R_{13}$ wherein in $(b_1)$ $W_1$ is hydrogen or sulpho, and $W_2$ is hydrogen, each $R_{14}$ is methyl, each $R_{15}$ is cyano, each $R_{16}$ and $R_{22}$ is hydroxy, and the sulpho group in each $(a_7)$ is independently in a position other than ortho to $R_{22}$, (9) those of (7) wherein each B and $G_x$—X is independently the radical of a coupling component of formula $(a_1)$,

(10) those of (7) wherein each $R_1$ is independently $R'_1$, each $R_3$ is independently $R'_3$, each $R_4$ is hydrogen, and each $R_5$ is independently $R'_5$,

(11) those of (10) wherein each T is —$SO_2N(R_1)$—, and each X and Y is —O—,

(12) those of (10) wherein each $R_3$ and $R_5$ is hydrogen, and each T is —$SO_2NH$—,

(13) those of (4) wherein when any B or $G_x$—X is the radical of a coupling component, it is independently the radical of a coupling component of formula $(a_1)$, $(a_2)$, $(a_3)$ or $(a_4)$,

(14) those of (4) wherein when any B or $G_x$—X is the radical of a coupling component, it is independently the radical of a coupling component of formula $(a_5)$, $(a_6)$, $(a_7)$ or $(a_9)$,

(15) those of (4) wherein when any B is the radical of a non-metallized diazo component, it is independently a group of formula $(c_1)$, $(c_2)$, $(c_3)$ or $(c_4)$, when any $G_x$—X is the radical of a metallized diazo component, it is independently a group of the formula

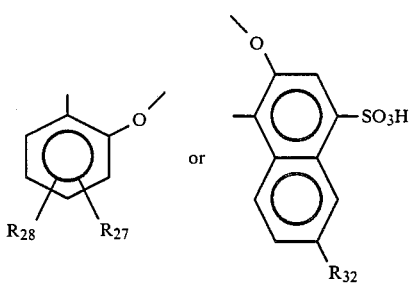

each $R_3$, $R_4$ and $R_5$ is hydrogen, $Me_1$ is nickel or copper, and $Me_2$ is cobalt, chromium or iron, and which contain a maximum of 3 sulpho groups per disazo unit of formula I,

(16) those of (15) wherein when any B or $G_x$—X is the radical of a coupling component, it is independently the radical of a coupling component of formula $(a_1)$, $(a_2)$, $(a_3)$, $(a_6)$, $(a_7)$ or $(a_8)$,

(17) those of (16) wherein each B and $G_x$—X is independently the radical of a coupling component of formula $(a_1)$, $(a_2)$ or $(a_7)$, and

(18) those of (16) wherein each $R_{10}$ is independently $(b_1)$ wherein $W_1$ is hydrogen or sulpho, and $W_2$ is hydrogen, each $R_{11}$ is independently methyl or carboxy, each $R_{12}$ is hydroxy, each $R_{13}$ is independently $R_{13}$ wherein in $(b_1)$ $W_1$ is hydrogen or sulpho, and $W_2$ is hydrogen, each $R_{14}$ is methyl, each $R_{15}$ is cyano, each $R_{16}$ and $R_{22}$ is hydroxy, and the sulpho group in each $(a_7)$ is independently in a position other than ortho to $R_{22}$.

In $(a_4)$ when $R_{18}$ is chlorine it is preferably in the 6-position. In $(a_7)$ the sulpho group is preferably in a position other than one ortho to $R_{22}$. In $(a_8)$ $R_{23}$ is preferably in the 3-position.

In $(c_2)$ the sulpho group is preferably in a position other than ortho to the azo group. In $(c_3)$ the azo group is preferably para or meta to the —NH— group, and any $R_{30}$ or $R_{31}$ substituents are preferably meta or para to each other; most preferably one is para to the —NH— group.

Any alkyl or alkoxy group in the molecule is preferably lower alkyl or lower alkoxy, especially methyl, ethyl, ethoxy or methoxy, except where otherwise stated.

Preferred cycloalkyl and alkylcycloalkyl groups are cyclohexyl optionally substituted by, for example, lower alkyl, especially by one, two or three methyl groups. The most preferred cycloalkyl group is unsubstituted cyclohexyl.

$R_1$ is preferably $R'_1$, where $R'_1$ is hydrogen, methyl or ethyl, especially hydrogen.

$R_3$ is preferably $R'_3$, where $R'_3$ is, hydrogen, chlorine, $C_{1-4}$alkyl or sulpho, especially hydrogen, and when T is —$N(R_1)SO_2$— and A is the radical of a coupling component and otherwise is hydrogen, chlorine or $C_{1-4}$alkyl, especially hydrogen.

$R_4$ is preferably hydrogen except when T is —$SO_2N(R_1)$— and B is the radical of a diazo component.

$R_5$ is preferably $R'_5$, where $R'_5$, is hydrogen, chlorine, $C_{1-4}$alkyl or sulpho, especially when T is —$SO_2N(R_1)$— and B is the radical of a coupling component and otherwise is hydrogen, chlorine or $C_{1-4}$alkyl, especially hydrogen.

T is preferably meta or para to A—N=N, $G_x$—N=N— and B—N=N—.

$R_{10}$ is preferably $(b_1)$.

$W_1$ is preferably hydrogen or sulpho.

$W_2$ is preferably hydrogen.

Each of $W_3$ and $W_4$, independently, is preferably hydrogen or methyl.

$R_{11}$ is preferably methyl or carboxy, especially methyl.

$R_{12}$ is preferably hydroxy.

$R'_{13}$ is preferably $R'_{13}$, where $R'_{13}$ is hydrogen, $C_{1-4}$-alkyl, cyclohexyl or $(b_1)$, more preferably hydrogen or butyl.

$R_{14}$ is preferably methyl.

$R_{15}$ is preferably cyano.

$R_{16}$ is preferably hydroxy.

$R_{17}$ is preferably hydrogen.

$R_{18}$ is preferably hydrogen.

$R_{19}$ is preferably methyl or sulpho.

$R_{20}$ and $R_{21}$ are preferably identical and are preferably carboxymethyl, 2-carboxyethyl or 2-hydroxyethyl.

$R_{22}$ is preferably hydroxy.

$R_{23}$ is preferably hydrogen.

$R_{24}$ is preferably hydrogen.

$R_{25}$ is preferably $(b_1)$.

$R_{26}$ is preferably —O— when in $G_x$ and when in B is preferably hydrogen or hydroxy.

$R_{27}$ is preferably hydrogen, nitro or sulpho.

$R_{28}$ is preferably hydrogen, chlorine, methyl, carboxy or nitro.

$R_{29}$ is preferably hydrogen, methyl or sulpho.

$R_{30}$ and $R_{31}$ are preferably different from $R_{29}$.

$R_{32}$ is preferably nitro.

Preferred (a$_7$) compounds are 1-hydroxynaphthalene-3-, 4- or 5-sulphonic acid, 2-hydroxynaphthalene-4-, 6- or 7-sulphonic acid, with 2-hydroxynaphthalene-6-sulphonic acid being most preferred.

$G_x$—XH and B—H when $G_x$—X— and/or B— is the radical of a coupling component are preferably $G'_x$—XH and B'—H, where $G'_x$—XH and B'—H, independently, are (a$_1$) especially with the preferred significances for $R_{10}$, $R_{11}$, $R_{12}$, $W_1$ and $W_2$, (a$_2$) especially with the preferred significances for $R_{13}$, $R_{14}$, $R_{15}$ and $R_{16}$, (a$_3$), (a$_6$) especially with the preferred significances for $R_{20}$ and $R_{21}$, (a$_7$) especially with the preferred positions and significances of $R_{22}$ and (a$_8$) especially with the $R_{23}$ as hydrogen. More preferably $G_x$—XH and B—H when $G_x$—X— and/or B— are radicals of coupling components are $G''_x$—XH and B''—H, where $G''_x$—XH and B''—H, independently, are (a$_1$) with the preferred significances for $R_{10}$, $R_{11}$, $R_{12}$, $W_1$ and $W_2$, (a$_2$) with the preferred significances for $R_{13}$, $R_{14}$, $R_{15}$ and $R_{16}$, (a$_7$) with $R_{22}$ as hydroxy in the preferred positions relative to the sulpho group with (a$_1$), where $R_{10}$, $R_{11}$, $R_{12}$, $W_1$ and $W_2$ have the preferred significances being especially preferred.

Preferred complexes are those where both $G_x$—X— and B— are radicals of coupling components.

More preferred complexes are those where both $G_x$—X— and B—, independently, are radicals of coupling components (a$_1$) to (a$_9$), especially of $G'_x$—XH and B'—H and $R_4$ is hydrogen, especially those complexes where $R_1$ is $R'_1$, $R_3$ is $R'_3$, $R_5$ is $R'_5$ and X and Y are both —O—.

Even more preferred complexes are those where both $G_x$—X— and B—, independently, are radicals of coupling components $G'_x$—XH and B'—H, preferably $G''_x$—XH and B''—H, T is —SO$_2$N(R$_1$)— and $R_4$ is hydrogen, especially those where $R_3$ is $R'_3$, most preferably hydrogen, $R_5$ is $R'_5$, most preferably hydrogen, $R_1$ is $R'_1$, most preferably hydrogen, and X and Y are both —O—.

Of the 1:1 and 1:2 metal complexes, the 1:2 metal complexes, especially those of formula $I_b$, are preferred. The preferred complexes of formula $I_b$ are those in which each $G_x$—X and B—, independently, is the radical of a coupling component (a$_1$) to (a$_9$), especially of components $G'_x$—XH and B'—H and $R_4$ is hydrogen, especially those where each $R_1$, independently, is $R'_1$, more preferably hydrogen, each $R_3$, independently, is $R'_3$, more preferably hydrogen, and each $R_5$, independently, is $R'_5$, more preferably hydrogen, with those complexes where T is —SO$_2$N(R$_1$)—, especially —SO$_2$NH—, X and Y are both —O— and Me$_2$ is chromium or cobalt, especially cobalt, being most preferred.

Particularly preferred 1:1 and 1:2 complexes are those which are in salt form.

Each and every scope of the complexes of formulae I, $I_a$ and $I_b$ that appears in the specification or claims of parent application Ser. No. 129,601 is hereby incorporated by reference.

The present invention also provides a process for the production of metal complexes containing the unit of formula I, comprising metallising a monometallizable compound of formula $I_x$

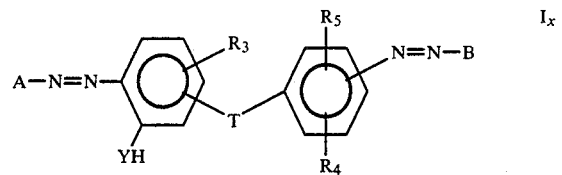

in which A is the radical of a metallizable diazo or coupling component, or a mixture thereof, or a mixture comprising a compound of formula $I_x$ and a further metallizable compound, with a di- or tri-valent complex forming metal.

The compounds of formula $I_x$ in which YH and $R_4$ are different also form part of the present invention and the process for the production thereof which comprises (a) coupling the bisdiazotized amine of formula II

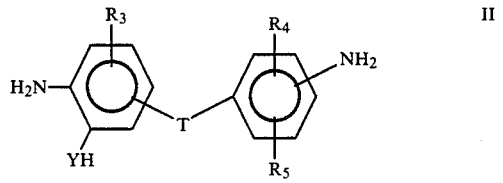

with coupling components AH and BH, or (b) coupling a compound of formula III

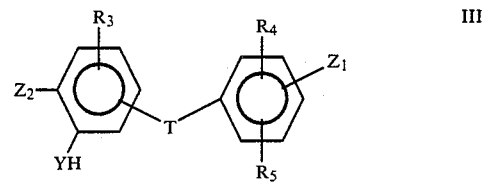

in which one of $Z_1$ and $Z_2$ is hydrogen and the other is —N=N—A (if $Z_2$) or —N=N—B (if $Z_1$), with a diazotized amine BNH$_2$ or ANH$_2$, respectively.

The metallization, diazotization and coupling reactions are carried out in accordance with known methods.

The preferred 1:2 complexes are prepared by reacting a mixture of compounds of formula $I_x$ with cobalt or chromium whereby mixtures of asymmetric and symmetric complexes are obtained.

The products are isolated in accordance with known methods.

The compounds of formulae II and III are either known or may be prepared in accordance with known methods from available starting materials.

The complexes of the present invention are useful for dyeing or printing textile and non-textile hydrophilic substrates, in particular those which are dyeable with anionic dyestuffs. Suitable such anionic dyeable substrates include natural or regenerated cellulose, natural or synthetic polyamide, basically modified polypropylene, polyurethane and anodized aluminium. Preferred substrates are nylon, wool, silk, leather, sized paper and anodized aluminium. More preferred substrates are wool, silk, leather and anodized aluminium, especially leather. Textile substrates may be in loose fibre, fabric or yarn form. The leather may be tanned by any conventional method.

The dyestuffs of the invention may be employed for dyeing in accordance with known methods; for example they can be mixed with blending agents. Dyeing and printing may be carried out in accordance with known methods, e.g. exhaust dyeing, padding or printing. The dyestuffs can also be employed together with other dyestuffs.

The dyestuffs of the invention, especially the 1:2 complexes of compounds of formula $I_x$, particularly those containing two sulpho groups in the molecule, have good build-up power especially on leather, and the dyeings have good wet-fastnesses and diffusion fastness into PVC. The 1:2 cobalt complexes give dyeings having good light-fastness, especially on leather.

The following Examples further serve to illustrate the invention. In the Examples all parts are by weight and temperatures are in degrees Centigrade.

EXAMPLE A1

27.9 Parts 2-amino-1-hydroxybenzene-4-sulphonic acid-4'-aminophenylamide dissolved in 150 parts 10% hydrochloric acid are bisdiazotized at 0° to 5° with 13.8 parts sodium nitrite. 50.8 Parts 3-methyl-1-phenyl-5-pyrazolone-4'-sulphonic acid dissolved in 300 parts 5% sodium hydroxide solution are added at 0° to 10° to the yellow-brown suspension of the bisdiazo compound and coupled at pH 10 with the addition of 30% sodium hydroxide solution, 14.1 Parts cobalt sulphate.heptahydrate dissolved in 100 parts water are added at 30° and the pH is maintained at 10 by addition of 30% sodium hydroxide. Subsequently, 9 parts of 10% aqueous hydrogen peroxide solution are added dropwise. After completion of the metallization, the dyestuff is precipitated and neutralized by the addition of sodium chloride and 30% hydrochloric acid and, after filtration, is dried at 100° in vacuo. The 1:2 cobalt complex product which is in the sodium salt form gives leather dyeings of yellow shades with good light fastness and diffusion fastness (especially resistance to migration in PVC).

The unmetallized dyestuff is, in free acid form, of formula

EXAMPLE A2

200 Parts ice are added to a solution of 27.9 parts 2-amino-1-hydroxybenzene-4-sulphonic acid-4'-aminophenylamide in 150 parts 10% HCl which is bisdiazotized with 13.8 parts sodium nitrite in 50 parts water. The bisdiazo suspension is reacted with 25.4 parts 3-methyl-1-phenyl-5-pyrazolone-4'-sulphonic acid in 120 parts 5% sodium hydroxide at 0° to 5° and coupled (with only one diazo group) at pH 4 with the addition of 5% sodium hydroxide. Subsequently, 17.4 parts 3-methyl-1-phenyl-5-pyrazolone dissolved in 120 parts 5% sodium hydroxide are added and coupling is effected at pH 10 with the addition of 5% sodium hydroxide. 40 Parts of 30% sodium hydroxide are added to the red brown disazo dye and the same is reacted with 14.1 parts cobalt sulfate.heptahydrate dissolved in 50 parts water. The Co (II) complex obtained is oxidized to the Co (III) complex by adding 9 parts 10% aqueous hydrogenperoxide. After metallization, the dye is salted out with sodium chloride, neutralized with 30% HCl, filtered and dried in vacuo at 100°. The sodium salt form of the 1:2 cobalt complex obtained gives yellow leather dyeings having good light fastness. The dyestuff has good covering power when dyeing leather. The unmetallized dyestuff, in the free acid form, is of formula

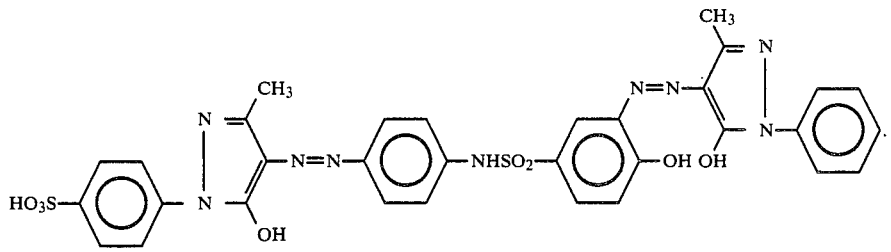

2-amino-1-hydroxybenzene-4-sulphonic acid-4'-aminophenylamide is produced by means of the condensation of 2-nitro-1-chlorobenzene-4-sulphonic acid chloride with 4-aminoacetanilide, the substitution of chlorine and simultaneous hydrolysis of the acetamino group by boiling with caustic soda, and subsequent reduction of the nitro group using sodium sulphide solution.

Table A contains further dyestuffs according to the invention, which may be produced similarly to those described in Examples A1 and A2, and which are characterized by the coupling component H—A, the bisdiazo component of formula VIII,

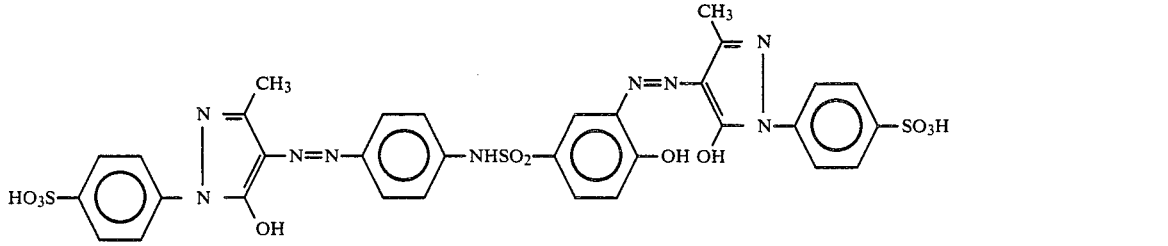

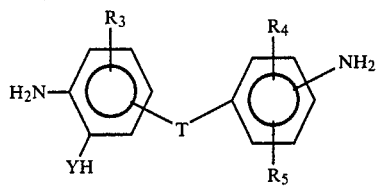 VIII the coupling component H—B, the complex-forming metal and the shade of the dyeing on leather.

In Examples A59 to A64 H—B corresponds to A—H and H—A to B—H.

2-amino-1-hydroxybenzene-4-sulphonic acid-3'-aminophenylamide-4'-sulphonic acid is produced by means of the condensation of 2-nitro-1-chlorobenzene-4-sulphonic acid chloride with 1,3-diaminobenzene-4-sulphonic acid, the substitution of chlorine by boiling with caustic soda and subsequent reduction of the nitro group using sodium sulphide.

2-amino-1-hydroxybenzene-5-sulphonic acid-4'-aminophenylamide is produced by means of the condensation of 2-hydroxybenzoxazole-6-sulphonic acid chloride with 4-aminoacetanilide and subsequent hydrolysis by boiling with caustic soda.

1-aminobenzene-4-sulphonic acid-3'-amino-2'-hydroxyphenylamide-5'-sulphonic acid is produced by means of the condensation of 1-acetaminobenzene-4-sulphonic acid chloride with 2-amino-1-hydroxy-6-nitrobenzene-4-sulphonic acid, hydrolysis of the acetamino group by boiling with caustic soda, and subsequent reduction of the nitro group using sodium sulphide.

TABLE A

| Ex. | H-A | Bisdiazo components of formula VIII | H-B | Metal complex | Shade on leather |
|---|---|---|---|---|---|
| A3 | 3-methyl-1-phenyl-5-pyrazolone-4'-sulphonic acid | 2-amino-1-hydroxybenzene-4-sulphonic acid-4'-aminophenylamide | 3-methyl-1-phenyl-5-pyrazolone-4'-sulphonic acid | Cr 1:2 | orange |
| A4 | 3-methyl-1-phenyl-5-pyrazolone-4'-sulphonic acid | 2-amino-1-hydroxybenzene-4-sulphonic acid-4'-aminophenylamide | 3-methyl-1-phenyl-5-pyrazolone-4'-sulphonic acid | Cu 1:1 | yellow |
| A5 | barbituric acid | 2-amino-1-hydroxybenzene-4-sulphonic acid-4'-aminophenylamide | 3-methyl-1-phenyl-5-pyrazolone-4'-sulphonic acid | Co 1:2 | yellow |
| A6 | " | 2-amino-1-hydroxybenzene-4-sulphonic acid-4'-aminophenylamide | 3-methyl-1-phenyl-5-pyrazolone-4'-sulphonic acid | Cr 1:2 | orange |
| A7 | " | 2-amino-1-hydroxybenzene-4-sulphonic acid-4'-aminophenylamide | 3-methyl-1-phenyl-5-pyrazolone-4'-sulphonic acid | Cu 1:1 | yellow |
| A8 | 3-cyano-6-hydroxy-4-methylpyridone-2 | 2-amino-1-hydroxybenzene-4-sulphonic acid-4'-aminophenylamide | 3-methyl-1-phenyl-5-pyrazolone-4'-sulphonic acid | Co 1:2 | orange |
| A9 | 3-cyano-6-hydroxy-4-methylpyridone-2 | 2-amino-1-hydroxybenzene-4-sulphonic acid-4'-aminophenylamide | 3-methyl-1-phenyl-5-pyrazolone-4'-sulphonic acid | Cr 1:2 | orange |
| A10 | 3-cyano-6-hydroxy-4-methylpyridone-2 | 2-amino-1-hydroxybenzene-4-sulphonic acid-4'-aminophenylamide | 3-methyl-1-phenyl-5-pyrazolone-4'-sulphonic acid | Cu 1:1 | orange |
| A11 | 3-carboxy-1-phenyl-5-pyrazolone-4'-sulphonic acid | 2-amino-1-hydroxybenzene-4-sulphonic acid-4'-aminophenylamide | 3-carboxy-1-phenyl-5-pyrazolone-4'-sulphonic acid | Co 1:2 | yellowish brown |
| A12 | 3-carboxy-1-phenyl-5-pyrazolone-4'-sulphonic acid | 2-amino-1-hydroxybenzene-4-sulphonic acid-4'-aminophenylamide | 3-carboxy-1-phenyl-5-pyrazolone | Co 1:2 | yellowish brown |
| A13 | 3-methyl-1-phenyl-5-pyrazolone-4'-sulphonic acid | 2-amino-1-hydroxybenzene-4-sulphonic acid-3'-aminophenylamide-4'-sulphonic acid | 3-methyl-1-phenyl-5-pyrazolone | Co 1:2 | yellow |
| A14 | 3-methyl-1-phenyl-5-pyrazolone-4'-sulphonic acid | 2-amino-1-hydroxybenzene-4-sulphonic acid-3'-aminophenylamide-4'-sulphonic acid | 3-methyl-1-phenyl-5-pyrazolone | Cr 1:2 | orange |
| A15 | 3-methyl-1-phenyl-5-pyrazolone-4'-sulphonic acid | 2-amino-1-hydroxybenzene-4-sulphonic acid-3'-aminophenylamide-4'-sulphonic acid | 3-methyl-1-phenyl-5-pyrazolone | Cu 1:1 | yellow |
| A16 | 3-methyl-1-phenyl-5-pyrazolone | 2-amino-1-hydroxybenzene-4-sulphonic acid-3'-aminophenylamide-4'-sulphonic acid | 3-methyl-1-phenyl-5-pyrazolone | Co 1:2 | yellow |
| A17 | acetoacetylamino-benzene | 2-amino-1-hydroxybenzene-4-sulphonic acid-3'-aminophenylamide-4'-sulphonic acid | acetoacetylamino-benzene | Co 1:2 | yellow |
| A18 | 5-amino-3,4'-dimethyl-1-phenylpyrazole | 2-amino-1-hydroxybenzene-4-sulphonic acid-3'-aminophenylamide-4'-sulphonic acid | 5-amino-3,4'-dimethyl-1-phenylpyrazole | Co 1:2 | brown |
| A19 | 3-[N,N—bis-(β-carboxyethyl)amino]phenol | 2-amino-1-hydroxybenzene-4-sulphonic acid-3'-aminophenylamide-4'-sulphonic acid | 3-[N,N—bis-(β-carboxyethyl-amino-phenol | Co 1:2 | brown |
| A20 | 3-[N,N—bis-(β-carboxyethyl)amino]phenol | 2-amino-1-hydroxybenzene-4-sulphonic acid-3'-aminophenylamide-4'-sulphonic acid | 3-[N,N—bis-(β-carboxyethyl-amino-phenol | Cu 1:1 | brown |
| A21 | 2-hydroxynaphthalene | 2-amino-1-hydroxybenzene-4-sulphonic acid-3'-aminophenylamide-4'-sulphonic acid | 2-hydroxynaphthalene | Co 1:2 | bordeaux |
| A22 | 3-methyl-1-phenyl-5- | 2-amino-1-hydroxybenzene- | acetoacetylamino- | Co 1:2 | yellow |

TABLE A-continued

| Ex. | H-A | Bisdiazo components of formula VIII | H-B | Metal complex | Shade on leather |
|---|---|---|---|---|---|
| | pyrazolone-4'-sulphonic acid | 4-sulphonic acid-4'-amino phenylamide | benzene | | |
| A23 | 3-methyl-1-phenyl-5-pyrazolone-4'-sulphonic acid | 2-amino-1-hydroxybenzene-4-sulphonic acid-4'-amino phenylamide | 3-[N,N—bis-($\beta$-carboxy-ethyl)-amino]-phenol | Co 1:2 | scarlet |
| A24 | 3-methyl-1-phenyl-5-pyrazolone-4'-sulphonic acid | 2-amino-1-hydroxybenzene-4-sulphonic acid-4'-amino phenylamide | 3-[N,N—bis-($\beta$-carboxy-ethyl)-amino]-phenol | Cr 1:2 | bordeaux |
| A25 | 1-hydroxynaphthalene 3-sulphonic acid | 2-amino-1-hydroxybenzene-4-sulphonic acid-4'-amino phenylamide | 3-[N,N—bis-($\beta$-carboxy-ethyl)-amino]-phenol | Co 1:2 | red |
| A26 | 1-hydroxynaphthalene-3-sulphonic acid | 2-amino-1-hydroxybenzene-4-sulphonic acid-4'-amino-phenylamide | 3-[N,N—bis-($\beta$-carboxyethyl)-amino]phenol | Cr 1:2 | violet |
| A27 | 1-hydroxynaphthalene-3-sulphonic acid | 2-amino-1-hydroxybenzene-4-sulphonic acid-4'-amino-phenylamide | 3-[N,N—bis-($\beta$-carboxyethyl)-amino]phenol | Cu 1:1 | red |
| A28 | 2-hydroxynaphthalene-6-sulphonic acid | 2-amino-1-hydroxybenzene-4-sulphonic acid-4'-amino-phenylamide | 2-hydroxynaphthalene-6-sulphonic acid | Co 1:2 | red |
| A29 | 2-hydroxynaphthalene-6-sulphonic acid | 2-amino-1-hydroxybenzene-4-sulphonic acid-4'-amino-phenylamide | 2-hydroxynaphthalene-6-sulphonic acid | Cr 1:2 | brown |
| A30 | 2-hydroxynapthalene-6-sulphonic acid | 2-amino-1-hydroxybenzene-4-sulphonic acid-4'-amino-phenylamide | 2-hydroxynaphthalene-6-sulphonic acid | Cu 1:1 | red |
| A31 | 2-aminonaphthalene-6-sulphonic acid | 2-amino-1-hydroxybenzene 4-sulphonic acid-4'-amino-phenylamide | 2-aminonaphthalene-6-sulphonic acid | Co 1:2 | dark brown |
| A32 | 1,3-diaminobenzene-4-sulphonic acid | 2-amino-1-hydroxybenzene 4-sulphonic acid-4'-amino-phenylamide | 3-methyl-1-phenyl-5-pyrazolone | Co 1:2 | brown |
| A33 | 3-methyl-1-phenyl-5-pyrazolone-4'-sulphonic acid | 2-amino-1-hydroxybenzene 4-sulphonic acid-4'-amino-phenylamide | 3-methyl-5-pyrazolone | Co 1:2 | yellow |
| A34 | 3-methyl-1-phenyl-5-pyrazolone-4'-sulphonic acid | 2-amino-1-hydroxybenzene 4-sulphonic acid-4'-amino-phenylamide | 3-carboxy-1-phenyl-5-pyrazolone | Co 1:2 | yellow brown |
| A35 | 3-methyl-1-phenyl-5-pyrazolone-4'-sulphonic acid | 2-amino-1-hydroxybenzene 4-sulphonic acid-4'-amino-phenylamide | 1-phenyl-5-pyrazolone-3-carboxylic acid dimethyl-amide | Co 1:2 | orange |
| A36 | 3-methyl-1-phenyl-5-pyrazolone-4'-sulphonic acid | 2-amino-1-hydroxybenzene 4-sulphonic acid-4'-amino-phenylamide | 3'-chloro-3-methyl-1-phenyl-5-pyrazolone | Co 1:2 | yellow |
| A37 | 3-methyl-1-phenyl-5-pyrazolone-4'-sulphonic acid | 2-amino-1-hydroxybenzene 4-sulphonic acid-4'-amino phenylamide | 3-methyl-1-phenyl-5-pyrazolone-3'-sulphonic acid-amide | Co 1:2 | yellow |
| A38 | 3-methyl-1-phenyl-5-pyrazolone-4'-sulphonic acid | 2-amino-1-hydroxybenzene 4-sulphonic acid-4'-amino phenylamide | 3'-cyano-3-methyl-1-phenyl-5-pyrazolone | Co 1:2 | yellow |
| A39 | 3-methyl-1-phenyl-5-pyrazolone-4'-sulphonic acid | 2-amino-1-hydroxybenzene 4-sulphonic acid-4'-amino phenylamide | 3-methyl-3'-nitro-1-phenyl-5-pyrazolone | Co 1:2 | yellow |
| A40 | 3-methyl-1-phenyl-5-pyrazolone-4'-sulphonic acid | 2-amino-1-hydroxybenzene 4-sulphonic acid-4'-amino phenylamide | 3'-carboxy-3-methyl-1-phenyl-5-pyrazolone | Co 1:2 | yellow |
| A41 | 3-methyl-1-phenyl-5-pyrazolone-3'-sulphonic acid | 2-amino-1-hydroxybenzene 4-sulphonic acid-4'-amino phenylamide | 3-methyl-1-phenyl-5-pyrazolone | Co 1:2 | yellow |
| A42 | 3-methyl-1-phenyl-5-pyrazolone-2'-sulphonic acid | 2-amino-1-hydroxybenzene 4-sulphonic acid-4'-amino phenylamide | 3-methyl-1-phenyl-5-pyrazolone | Co 1:2 | yellow |
| A43 | 2'-chloro-3-methyl-1-phenyl-5-pyrazolone-5'-sulphonic acid | 2-amino-1-hydroxybenzene 4-sulphonic acid-4'-amino phenylamide | 3-methyl-1-phenyl-5-pyrazolone | Co 1:2 | yellow |
| A44 | 2',5'-dichloro-3-methyl-1-phenyl-5-pyrazolone-4'-sulphonic acid | 2-amino-1-hydroxybenzene 4-sulphonic acid-4'-amino phenylamide | 3-methyl-1-phenyl-5-pyrazolone | Co 1:2 | yellow |
| A45 | 3-methyl-1-$\beta$-naphthyl-5-pyrazolone-6'-sulphonic acid | 2-amino-1-hydroxybenzene 4-sulphonic acid-4'-amino phenylamide | 3-methyl-1-$\beta$-naphthyl-5-pyrazolone-6'-sulphonic acid | Co 1:2 | yellow brown |
| A46 | 1,3-diphenyl-5-pyrazolone-2'-sulphonic acid | 2-amino-1-hydroxybenzene-4-sulphonic acid-4'-amino-phenylamide | 1,3-diphenyl-5-pyrazolone-2'-sulphonic acid | Co 1:2 | yellow |
| A47 | 1-n-butyl-3-cyano-6-hydroxy-4-methyl-pyridone-2 | 2-amino-1-hydroxybenzene-4-sulphonic acid-4'-amino-phenylamide | 3-methyl-1-phenyl-5-pyrazolone-4'-sulphonic acid | Co 1:2 | orange |
| A48 | 3-cyano-6-hydroxy-4-methyl-1-$\gamma$-methoxy-propylpyridone-2 | 2-amino-1-hydroxybenzene-4-sulphonic acid-4'-amino-phenylamide | 3-methyl-1-phenyl-5-pyrazolone-4'-sulphonic acid | Co 1:2 | orange |

TABLE A-continued

| Ex. | H-A | Bisdiazo components of formula VIII | H-B | Metal complex | Shade on leather |
|---|---|---|---|---|---|
| A49 | 3-methyl-1-phenyl-5-pyrazolone-4'-sulphonic acid | 2-amino-1-hydroxybenzene-5-sulphonic acid-4'-aminophenylamide | 3-methyl-1-phenyl-5-pyrazolone-4'-sulphonic acid | Co 1:2 | orange |
| A50 | 3-methyl-1-phenyl-5-pyrazolone-4'-sulphonic acid | 2-amino-1-hydroxybenzene-5-sulphonic acid-4'-aminophenylamide | 3-methyl-1-phenyl-5-pyrazolone | Co 1:2 | orange |
| A51 | 3-methyl-1-phenyl-5-pyrazolone-4'-sulphonic acid | 2-amino-1-hydroxybenzene-5-sulphonic acid-4'-aminophenylamide | 3-carboxy-1-phenyl-5-pyrazolone | Co 1:2 | orange |
| A52 | 3-carboxy-1-phenyl-5-pyrazolone-4'-sulphonic acid | 2-amino-1-hydroxybenzene-5-sulphonic acid-4'-aminophenylamide | 3-carboxy-1-phenyl-5-pyrazolone | Co 1:2 | orange |
| A53 | barbituric acid | 2-amino-1-hydroxybenzene-5-sulphonic acid-4'-aminophenylamide | 3-methyl-1-phenyl-5-pyrazolone-4'-sulphonic acid | Co 1:2 | yellow brown |
| A54 | 1-n-butyl-3-cyano-6-hydroxy-4-methylpyridone-2 | 2-amino-1-hydroxybenzene-5-sulphonic acid-4'-aminophenylamide | 3-methyl-1-phenyl-5-pyrazolone-4'-sulphonic acid | Co 1:2 | orange |
| A55 | 3-cyano-6-hydroxy-1-γ-methoxypropyl-4-methylpyridone-2 | 2-amino-1-hydroxybenzene-5-sulphonic acid-4'-aminophenylamide | 3-methyl-1-phenyl-5-pyrazolone-4'-sulphonic acid | Co 1:2 | orange |
| A56 | 3-cyano-6-hydroxy-4-methylpyridone-2 | 2-amino-1-hydroxybenzene-5-sulphonic acid-4'-aminophenylamide | 3-methyl-1-phenyl-5-pyrazolone-4'-sulphonic acid | Co 1:2 | orange |
| A57 | 2-hydroxynaphthalene-6-sulphonic acid | 2-amino-1-hydroxybenzene-5-sulphonic acid-4'-aminophenylamide | 2-hydroxynaphthalene-6-sulphonic acid | Co 1:2 | bordeaux |
| A58 | 1-hydroxynaphthalene-3-sulphonic acid | 2-amino-1-hydroxybenzene-5-sulphonic acid-4'-aminophenylamide | 1-hydroxynaphthalene-3-sulphonic acid | Co 1:2 | bordeaux |
| A59 | 3-methyl-1-phenyl-5-pyrazolone-4'-sulphonic acid | 1-aminobenzene-4-sulphonic acid-3'-amino-2'-hydroxyphenylamide-5'-sulphonic acid | 3-methyl-1-phenyl-5-pyrazolone | Co 1:2 | yellow |
| A60 | 3-methyl-1-phenyl-5-pyrazolone | 1-aminobenzene-4-sulphonic acid-3'-amino-2'-hydroxyphenylamide-5'-sulphonic acid | 3-methyl-1-phenyl-5-pyrazolone | Co 1:2 | yellow |
| A61 | 3-carboxy-1-phenyl-5-pyrazolone | 1-aminobenzene-4-sulphonic acid-3'-amino-2'-hydroxyphenylamide-5'-sulphonic acid | 3-carboxy-1-phenyl-5-pyrazolone | Co 1:2 | yellow brown |
| A62 | 2-hydroxynaphthalene | 1-aminobenzene-4-sulphonic acid-3'-amino-2'-hydroxyphenylamide-5'-sulphonic acid | 2-hydroxynaphthalene | Co 1:2 | scarlet |
| A63 | acetoacetylaminobenzene | 1-aminobenzene-4-sulphonic-acid-3'-amino-2'hydroxy phenylamide-5'-sulphonic acid | acetoacetylaminobenzene | Co 1:2 | yellow |
| A64 | 3-[N,N—bis-(β-carboxyethyl)amino]phenol | 1-aminobenzene-4-sulphonic-acid-3'-amino-2'hydroxy phenylamide-5'-sulphonic acid | 3-[N,N—bis-(β-carboxyethyl)-amino]phenol | Co 1:2 | scarlet |

EXAMPLE B1

23.4 Parts of 2-amino-1-hydroxy-6-nitrobenzene-4-sulphonic acid are diazotised as usual and coupled at a pH of 11 with 26.4 parts of 1-aminobenzene-4-sulphonic acid-3'-hydroxyphenylamide suspended in 400 parts of water. When coupling has ended, the aminomonoazo dyestuff suspension is heated to 50° C., and 14.1 parts of cobalt sulphate heptahydrate, dissolved in 50 parts of water, are added in drops at a pH of 11. When the metallization is complete, 35 parts of 30% hydrochloric acid are added at 0°–5° C., and diazotisation then takes place using 6.9 parts of sodium nitrite. After diazotisation, 17.4 parts of 3-methyl-1-phenyl-5-pyrazolone, dissolved in 120 parts of 5% caustic soda, are added, and the solution is coupled at a pH of 10 by adding 5% caustic soda. The dyestuff solution is neutralised with 30% hydrochloric acid and spray dried. The 1:2 cobalt complex of the dyestuff of the following formula, which is obtained in the form of the sodium salt, dyes leather in red-brown shades which are notable for good light fastness and good diffusion fastness.

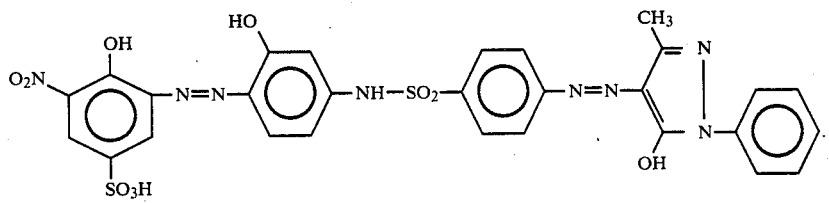

The same dyestuff may also be obtained by diazotising and coupling the aminomonoazo dyestuff before metallization and then metallizing the product with the cobalt containing compound.

1-aminobenzene-4-sulphonic acid-3'-hydroxyphenylamide is obtained by means of condensation of 1-acetaminobenzene-4-sulphonic acid chloride with 3-amino-1-hydroxybenzene, with subsequent hydrolysis of the acetamino group by boiling with caustic soda.

Table B contains further dyestuffs according to the invention, which may be produced similarly to those described in Example B1, and which are characterised by the diazo component A—NH$_2$, the middle component of the formula

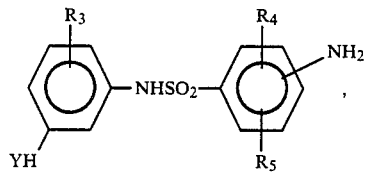

the coupling component H—B, the complex-forming metal and the shade of the dyeing on leather.

has ended, the dyestuff is separated by adding sodium chloride and neutralising with 30% hydrochloric acid, and after filtering it is vacuum-dried at 100° C. The 1:2 cobalt mixed complex of the dyes listed in Examples A1 and A2, which is obtained in the form of the sodium salt, dyes leather in yellow shades, which are particularly notable for their good light fastness, good diffusion fastness and good covering capacity.

EXAMPLE C2

36.5 parts of the metal-free disazo dyestuff A49 and 40.5 parts of the metal-free disazo dyestuff A50 from Table A are stirred into 1000 parts of water and 30% caustic soda at a pH of 11, and then reacted to form the 1:2 cobalt mixed complex as in Example C1, and isolated. The 1:2 cobalt mixed complex obtained in the form of the sodium salt dyes leather in orange shades. The dyeings are notable particularly for their good light fastness, good diffusion fastness and good covering capacity.

Table C contains further dyestuffs according to the invention, which may be produced similarly to those described in Examples C1 and C2.

TABLE B

| Ex. | A-NH$_2$ | middle component | H-B | Complex Metal | Shade on leather |
|---|---|---|---|---|---|
| B2 | 2-amino-1-hydroxy-4-nitrobenzene-6-sulphonic acid | 1-aminobenzene-4-sulphonic-acid-3'-hydroxyphenylamide | 3-methyl-1-phenyl-5-pyrazolone | Co 1:2 | brown |
| B3 | 2-amino-1-hydroxy-4-nitrobenzene-6-sulphonic acid | 1-aminobenzene-4-sulphonic-acid-3'-hydroxyphenylamide | 3-methyl-1-phenyl-5-pyrazolone | Cr 1:2 | brown |
| B4 | 2-amino-1-hydroxy-4-nitrobenzene-6-sulphonic acid | 1-aminobenzene-4-sulphonic-acid-3'-hydroxyphenylamide | 3-methyl-1-phenyl 5-pyrazolone-4'-sulphonic acid | Co 1:2 | brown |
| B5 | 2-amino-1-hydroxy-6-nitrobenzene-4-sulphonic acid | 1-aminobenzene-4-sulphonic-acid-3'-hydroxyphenylamide | 3-methyl-1-phenyl-5-pyrazolone-4'-sulphonic acid | Co 1:2 | brown |
| B6 | 2-amino-1-hydroxy-benzene-4-sulphonic acid | 1-aminobenzene-4-sulphonic-acid-3'-hydroxyphenylamide | 3-methyl-1-phenyl-5-pyrazolone-4'-sulphonic acid | Co 1:2 | scarlet |
| B7 | 2-amino-1-hydroxy-benzene-4-sulphonic acid | 1-aminobenzene-4-sulphonic-acid-3'-hydroxyphenylamide | 3-methyl-1-phenyl-5-pyrazolone | Co 1:2 | scarlet |
| B8 | 2-amino-1-hydroxy-4-nitrobenzene | 1-aminobenzene-4-sulphonic-acid-3'-hydroxyphenylamide | 3-methyl-1-phenyl-5-pyrazolone-4'-sulphonic acid | Co 1:2 | brown |
| B9 | 2-amino-4,6-dinitro-1-hydroxybenzene | 1-aminobenzene-4-sulphonic-acid-3'-hydroxyphenylamide | 3-methyl-1-phenyl-5-pyrazolone-4'-sulphonic acid | Co 1:2 | brown |

EXAMPLE C1

200 Parts of ice are added to 27.9 parts of 2-amino-1-hydroxybenzene-4-sulphonic acid-4'-aminophenylamide, dissolved in 150 parts of 10% hydrochloric acid, and the solution is bisdiazotised with 13.8 parts of sodium nitrite dissolved in 50 parts of water. 38.1 Parts of 3-methyl-1-phenyl-5-pyrazolone-4'-sulphonic acid, dissolved in 220 parts of 5% caustic soda, are added to the bisdiazo suspension thus obtained at 0°–5° C., and then 40 parts of 40% sodium acetate solution are added in drops. 8.7 Parts of 3-methyl-1-phenyl-5-pyrazolone, dissolved in 120 parts of 5% caustic soda, are then added and the solution is coupled at a pH of 10 by adding 5% caustic soda. After adding 40 parts of 30% caustic soda, it is heated to 50° C., and 14.1 parts of cobalt sulphate heptahydrate, dissolved in 50 parts of water, are added. 9 Parts of 10% hydrogen peroxide solution are then added in drops. When metallisation

TABLE C

| Ex. | metal-free disazo dyestuffs from examples | Complex Metal | shade on leather |
|---|---|---|---|
| C3 | A1 + A5 | Co 1:2 | yellow |
| C4 | A1 + A5 | Cr 1:2 | orange |
| C5 | A1 + A8 | Co 1:2 | orange |
| C6 | A1 + A8 | Cr 1:2 | orange |
| C7 | A2 + A5 | Co 1:2 | yellow |
| C8 | A2 + A12 | Co 1:2 | yellow-brown |
| C9 | A1 + A22 | Co 1:2 | yellow |
| C10 | A2 + A23 | Co 1:2 | brown |
| C11 | A1 + A25 | Co 1:2 | brown |
| C12 | A2 + A25 | Co 1:2 | brown |
| C13 | A1 + A28 | Co 1:2 | brown |
| C14 | A2 + A28 | Co 1:2 | brown |
| C15 | A1 + A33 | Co 1:2 | yellow |
| C16 | A1 + A34 | Co 1:2 | yellow |
| C17 | A8 + A47 | Co 1:2 | orange |
| C18 | A2 + A50 | Co 1:2 | orange |
| C19 | A49 + A54 | Co 1:2 | orange |
| C20 | A49 + A56 | Co 1:2 | orange |
| C21 | A49 + A57 | Co 1:2 | brown |
| C22 | A50 + A57 | Co 1:2 | brown |

TABLE C-continued

| Ex. | metal-free disazo dyestuffs from examples | Complex Metal | shade on leather |
|---|---|---|---|
| C23 | A1 + B1 | Co 1:2 | brown |

Dyeing Example 1

100 Parts of shaved weight chrome-tanned and neutralised grain leather and 250 parts water at 55° are put into a dye drum and with drumming, 0.5 parts of the dyestuff complex of Example C1 dissolved in 20 parts water are added and drumming is carried out for 30 minutes at 55°. The leather is then treated for a further 30 minutes in the same bath with 4 parts of a conventional fat liquor based on sperm oil, and 5 parts of 8% formic acid are slowly added and treatment is carried out for a further 10 minutes. After the conventional finishing process, a yellow level leather dyeing is obtained.

Dyeing Example 2

100 Parts intermediate dried chrome-tanned suede split leather are entered into a dye drum with 400 parts of water, 2 parts of 25% aqueous ammonia, and 0.2 parts of a conventional wetting agent and are drummed for 1 hour at 50°. The bath is then emptied. The so treated wet leather is dyed at 60° in a bath containing 400 parts water, 1 paart 25% aqueous ammonia and 5 parts of the dyestuff C1 dissolved in 200 parts water for 90 minutes. 50 Parts of 8% formic acid are slowly added and treatment is continued for a further 30 minutes. After rinsing and finishing in the usual manner, a yellow dyeing having good light fastness is obtained.

Dyeing Example 3

When 100 parts of sheep nappa are treated and dyed in accordance with Example 2 a level yellow dyeing having good light fastness is obtained.

Dyeing Example 4

100 Parts of conventionally shaved weight chrome-tanned grain leather are put into a dye drum with 150 parts water at 40°, 1 part sodium formate is added and drumming is effected for 10 minutes, then 1 part sodium bicarbonate is added and drumming is effected for 30 minutes. Subsequently, 5 parts of a light fast synthetic tanning agent are added and drumming is effected for 1 hour at 40°. The bath is drained. The so treated leather is drummed with 1 part of the dyestuff of Example C1 dissolved in 150 parts water at 40° and 10 parts of a conventional sperm oil for 1 hour. After adding 250 parts water having a temperature of 60°, drumming is continued for a further hour. 15 Parts of 8% formic acid are added slowly whilst drumming is continued for 40 minutes. A further part of the dyestuff of Example C1, dissolved in 50 parts water at 60° is added slowly whilst drumming is continued for a further 40 minutes. The whole is then acidified with 20 parts 8% formic acid with drumming for a further 30 minutes. After drying and finishing in the normal manner a level yellow dyeing with good light fastness is obtained.

The dyestuffs of Examples A1 to A64, B1 to B9 and C2 to C23 may be employed in accordance with the methods of Examples 1 to 4 above to give dyeings having notable fastnesses.

What is claimed is:
1. A 1:2 metal complex of the formula

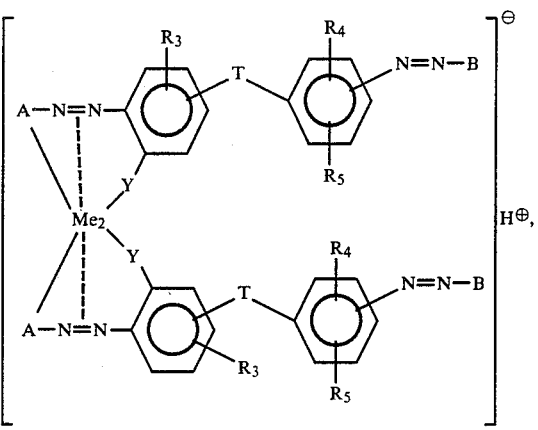

or a salt thereof each cation of which is non-chromophoric,
wherein
each A is independently the radical of a metallized diazo component or a metallized coupling component,
each B is independently the radical of a non-metallized diazo component or a non-metallized coupling component, with the proviso that when an A is the radical of a metallized diazo component, the B of the same azo unit is the radical of a non-metallized coupling component,
each $R_3$ independently is hydrogen, chloro, bromo, $C_{1-4}$alkyl, $C_{1-4}$alkoxy, sulfo, nitro or cyano when the T attached to the same ring is —N($R_1$)SO$_2$— and the A of the A—N=N— group attached to the same ring is the radical of a metallized coupling component and otherwise is hydrogen, chloro, bromo, $C_{1-4}$alkyl or $C_{1-4}$alkoxy,
each $R_4$ independently is hydrogen or carboxy when the T attached to the same ring is —SO$_2$N($R_1$)— and the B of the B—N=N— group attached to the same ring is the radical of a non-metallized coupling component, is hydroxy or amino when the T attached to the same ring is —SO$_2$N($R_1$)— and the B of the B—N=N— group attached to the sae ring is the radical of a non-metallized diazo component and is hydrogen, carboxy or $C_{1-4}$alkoxy when the T attached to the same ring is —N($R_1$)SO$_2$—,
with the proviso that $R_4$ is hydrogen when it is ortho to the B—N=N— group and the B of said B—N=N— group contains a metallizable substituent ortho to the —N=N— radical thereof,
each $R_5$ independently is hydrogen, chloro, bromo, $C_{1-4}$alkyl, $C_{1-4}$alkoxy, sulfo, nitro or cyano when the T attached to the same ring is —SO$_2$N($R_1$)— and the B of the B—N=N— group attached to the same ring is the radical of a non-metallized coupling component and otherwise is hydrogen, chloro, bromo, $C_{1-4}$alkyl or $C_{1-4}$alkoxy, with the proviso that $R_5$ is other than $C_{1-4}$alkoxy when it is ortho to the B—N=N— group and the B of said B—N=N— group contains a metallizable substituent ortho to the —N=N— radical thereof,
each T is independently —SO$_2$N($R_1$)— or —N($R_1$)SO$_2$—
wherein $R_1$ is hydrogen; $C_{1-4}$alkyl; $C_{1-4}$alkyl substituted by phenyl or carboxy or $C_{2-4}$alkyl substituted in 2-, 3- or 4-position by phenoxy, $C_{1-4}$alkoxy, chloro or hydroxy, with the proviso that T is —N(R$_1$)SO$_2$— when the A of the A—N=N— group attached to the same ring is the radical of a metallized diazo component and is —SO$_2$N(R$_1$)— when the B of the B—N=N— group attached to the same ring is the radical of a non-metallized diazo component, each Y independently is —O— or —COO— when the A of the A—N=N— group ortho thereto is the radical of a metallized coupling component and is —O— or —NH— when the A of the A—N=N— group ortho thereto is the radical of a metallized diazo component, and Me$_2$ is a trivalent 1:2 metal complex-forming metal ion, with the proviso that each azo unit of the 1:2 metal complex contains at least one water-solubilizing group, wherein each azo unit has the formula

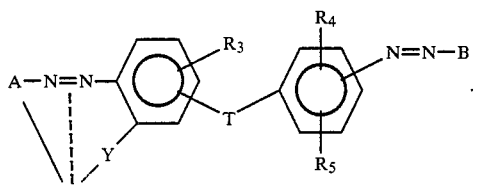

2. A 1:2 metal complex according to claim 1, or a salt thereof each cation of which is non-chromophoric, with the proviso that each azo unit of the 1:2 metal complex contains a maximum of 3 sulfo groups.

3. A 1:2 metal complex according to claim 1, or a salt thereof each cation of which is non-chromophoric, wherein each water-solubilizing group is sulfo or carboxy.

4. A 1:2 metal complex according to claim 1, or a salt thereof each cation of which is non-chromophoric, wherein
each A is independently the radical of a metallized coupling component, and
each B is independently the radical of a non-metallized coupling component.

5. A 1:2 metal complex according to claim 1, or a salt thereof each cation of which is non-chromophoric, wherein
each A is independently the radical of a metallized coupling component,
each B is independently the radical of a non-metallized diazo component, and
each T is independently —SO$_2$N(R$_1$)—.

6. A 1:2 metal complex according to claim 1, or a salt thereof each cation of which is non-chromophoric, wherein
each A is independently the radical of a metallized diazo component,
each B is independently the radical of a non-metallized coupling component, and
each T is independently —N(R$_1$)SO$_2$—.

7. A 1:2 metal complex according to claim 1, or a salt thereof each cation of which is non-chromophoric, wherein
each A is independently G$_x$—X,
wherein G$_x$—X is the radical of a metallized diazo component or a metallized coupling component,
wherein X is —O—, —NH— or —COO—, with the provisos that (i) X is ortho to the —N=N— radical and (ii) X is —O— or —COO— when G$_x$—X is the radical of a metallized diazo component.

8. A 1:2 metal complex according to claim 1 having the formula

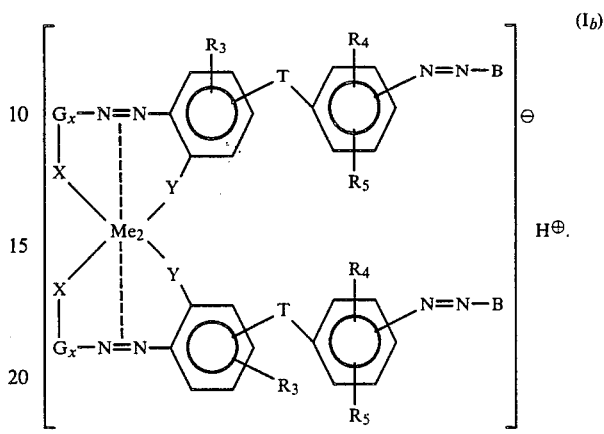

or a salt thereof each cation of which is non-chromophoric, wherein
each B is independently the radical of a non-metallized diazo component or a non-metallized coupling component,
with the proviso that when G$_x$—X is the radical of a metallized diazo component, the B of the same azo unit is the radical of a non-metallized coupling component,
each G$_x$—X is independently the radical of a metallized diazo component or a metallized coupling component, wherein X is —O—, —NH— or —COO—, with the provisos that (i) X is ortho to the —N=N— radical and (ii) X is —O— or —COO— when G$_x$—X is the radical of a metallized diazo component,
each R$_3$ independently is hydrogen, chloro, bromo, $C_{1-4}$alkyl, $C_{1-4}$alkoxy, sulfo, nitro or cyano when the T attached to the same ring is —N(R$_1$)SO$_2$— and the G$_x$—X of the (G$_x$—X)—N=N— group attached to the same ring is the radical of a metallized coupling component and otherwise is hydrogen, chloro, bromo, $C_{1-4}$alkyl or $C_{1-4}$alkoxy,
each R$_4$ independently is hydrogen or carboxy when the T attached to the same ring is —SO$_2$N(R$_1$)— and the B of the B—N=N— group attached to the same ring is the radical of a non-metallized coupling component, is hydroxy or amino when the T attached to the same ring is —SO$_2$N(R$_1$)— and the B of the B—N=N— group attached to the same ring is the radical of a non-metallized diazo component and is hydrogen, carboxy or $C_{1-4}$alkoxy when the T attached to the same ring is —N(R$_1$)SO$_2$—, with the proviso that R$_4$ is hydrogen when it is ortho to the B—N=N— group and the B of said B—N=N— group contains a metallizable substituent ortho to the —N=N— radical thereof,
each R$_5$ independently is hydrogen, chloro, bromo, $C_{1-4}$alkyl, $C_{1-4}$alkoxy, sulfo, nitro or cyano when the T attached to the same ring is —SO$_2$N(R$_1$)— and the B of the B—N=N— group attached to the same ring is the radical of a non-metallized coupling component and otherwise is hydrogen, chloro, bromo, $C_{1-4}$alkyl or $C_{1-4}$alkoxy, with the proviso that R$_5$ is other than $C_{1-4}$alkoxy when it is ortho to the B—N=N— group and the B of said B—N=N— group contains a metallizable substituent ortho to the —N=N— radical thereof, each T is independently —SO$_2$N(R$_1$)— or —N(R$_1$)SO$_2$—, wherein R$_1$ is hydrogen; C$_{1-4}$alkyl; C$_{1-4}$alkyl substituted by phenyl or carboxy or C$_{2-4}$alkyl substituted in 2-, 3- or 4-position by phenoxy, C$_{1-4}$alkoxy, chloro or hydroxy, with the proviso that T is —N(R$_1$)SO$_2$— when the G$_x$—X of the (G$_x$—X)—N=N— group attached to the same ring is the radical of a metallized diazo component and is —SO$_2$N(R$_1$)— when the B of the B—N=N— group attached to the same ring is the radical of a non-metallized diazo component, each Y independently is —O— or —COO— when the G$_x$—X of the (G$_x$—X)—N=N— group ortho thereto is the radical of a metallized coupling component and is —O— or —NH— when the G$_x$—X of the (G$_x$—X)—N=N— group ortho thereto is the radical of a metallized diazo component, and Me$_2$ is a trivalent 1:2 metal complex-forming metal ion, with the proviso that each azo unit of the 1:2 metal complex contains at least one water-solubilizing group, wherein each azo unit has the formula

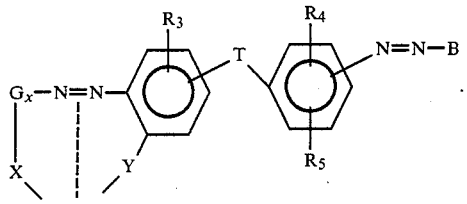

9. A 1:2 metal complex according to claim 8, or a salt thereof each cation of which is non-chromophoric, wherein any water-solubilizing group is sulfo or carboxy.

10. A 1:2 metal complex according to claim 9, or a salt thereof each cation of which is non-chromophoric, wherein each B independently, when the radical of a non-metallized diazo component, is

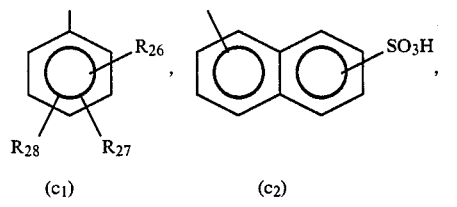

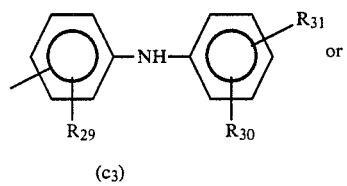

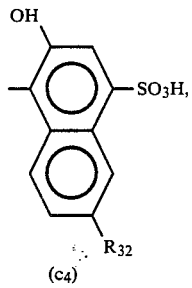

wherein R$_{26}$ is hydrogen, methoxy, carboxy or hydroxy,

R$_{27}$ is hydrogen, chloro, methyl, methoxy, nitro or sulfo,

R$_{28}$ is hydrogen, chloro, methyl, cyano, carboxy, nitro, sulfo, —SO$_2$NW$_3$W$_4$ or acetamido, wherein each of W$_3$ and W$_4$ is independently hydrogen, C$_{1-4}$alkyl or C$_{2-4}$alkyl substituted in the 2-, 3- or 4-position by hydroxy or C$_{1-4}$alkoxy, R$_{29}$ is hydrogen, chloro, methyl, methoxy or sulfo, R$_{30}$ is hydrogen or nitro, R$_{31}$ is hydrogen, nitro or sulfo, and R$_{32}$ is hydrogen or nitro, and each G$_x$—X independently, when the radical of a metallized diazo component, is

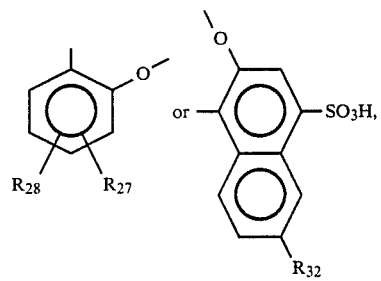

wherein R$_{27}$, R$_{28}$ and R$_{32}$ are as defined above.

11. A 1:2 metal complex according to claim 10, or a salt thereof each cation of which is non-chromophoric, wherein each R$_{26}$ is independently hydrogen or hydroxy, each R$_{27}$ is independently hydrogen, nitro or sulfo, and each R$_{28}$ is independently hydrogen, chloro, methyl or carboxy.

12. A 1:2 metal complex according to claim 9, or a salt thereof each cation of which is non-chromophoric, wherein Me$_2$ is chromium or cobalt.

13. A 1:2 metal complex according to claim 12, or a salt thereof each cation of which is non-chromophoric, wherein Me$_2$ is cobalt.

14. A 1:2 metal complex according to claim 9, or an alkali metal salt thereof.

15. A 1:2 metal complex according to claim 9, or a salt thereof each cation of which is non-chromophoric, wherein each B independently, when the radical of a non-metallized coupling component, is the radical of a coupling component of the formula

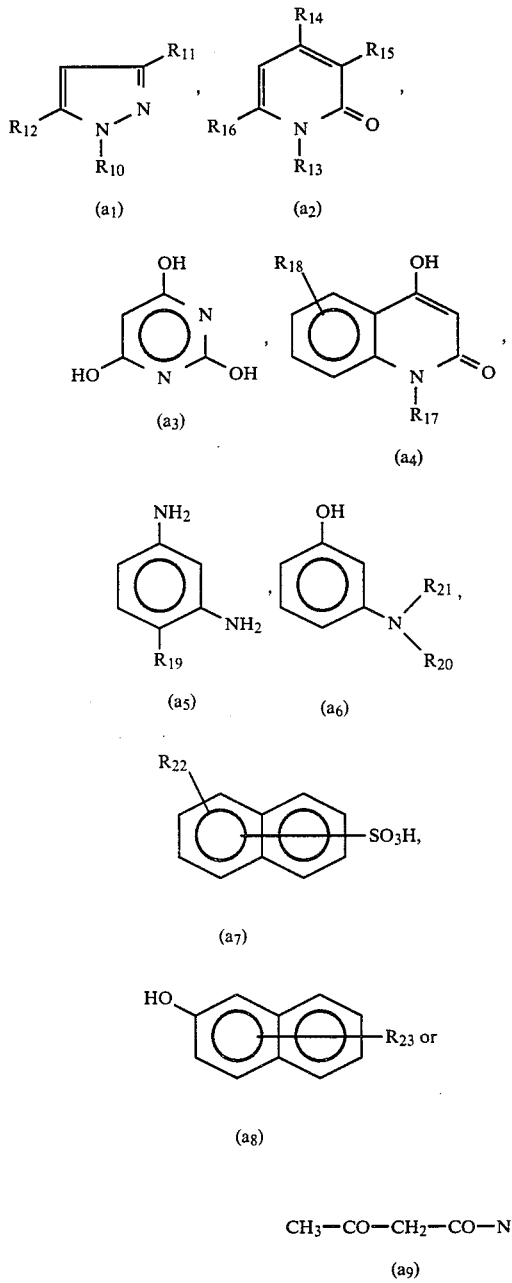

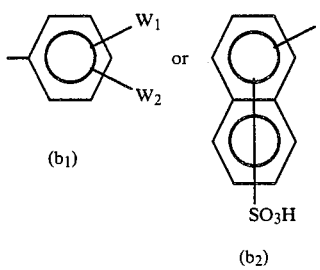

wherein $R_{10}$ is hydrogen,

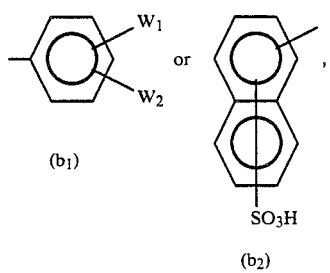

wherein $W_1$ is hydrogen, chloro, methyl, methoxy, cyano, nitro, carboxy, —$SO_2NW_3W_4$ or sulfo, wherein each of $W_3$ and $W_4$ is independently hydrogen, $C_{1-4}$alkyl or $C_{2-4}$alkyl substituted in the 2-, 3- or 4-position by hydroxy or $C_{1-4}$alkoxy, and $W_2$ is hydrogen, chloro, methyl, methoxy or carboxy, $R_{11}$ is $C_{1-4}$alkyl, phenyl, carboxy or —$CONW_3W_4$, wherein $W_3$ and $W_4$ are as defined above, $R_{12}$ is —OH or —$NH_2$, $R_{13}$ is hydrogen; —$NH_2$; phenylamino; $C_{1-8}$alkyl; $C_{6-9}$cycloalkyl; cycloalkyl substituted by 1, 2 or 3 alkyl groups, the total number of carbon atoms therein being 6 to 9, inclusive; carboxy($C_{1-4}$alkyl); $C_{2-4}$alkyl substituted in the 2-, 3- or 4-position by hydroxy, methoxy, ethoxy, chloro or sulfo,

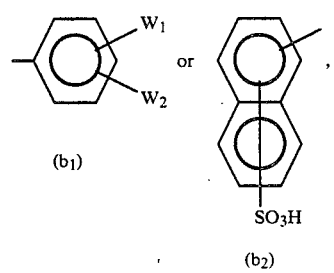

wherein $W_1$ and $W_2$ are as defined above, $R_{14}$ is hydrogen, hydroxy, methyl, carboxy, phenyl or —$CH_2$—$SO_3H$, $R_{15}$ is hydrogen, carboxy, sulfo, acetyl or cyano, $R_{16}$ is hydrogen, hydroxy or methyl, with the proviso that at least one of $R_{14}$ and $R_{16}$ is hydroxy, $R_{17}$ is hydrogen or $C_{1-4}$alkyl, $R_{18}$ is hydrogen or chloro, $R_{19}$ is hydrogen, methyl, methoxy, chloro, carboxy or sulfo, each of $R_{20}$ and $R_{21}$ is independently hydrogen, $C_{1-4}$alkyl, carboxymethyl, 2-carboxyethyl or 2-hydroxyethyl, $R_{22}$ is —OH or —$NH_2$, $R_{23}$ is hydrogen or carboxy, $R_{24}$ is hydrogen or $C_{1-4}$alkyl, and $R_{25}$ is $C_{1-8}$alkyl; $C_{6-9}$cycloalkyl; cycloalkyl substituted by 1, 2 or 3 alkyl groups, the total number of carbon atoms therein being 6 to 9, inclusive;

wherein $W_1$ and $W_2$ are as defined above, and each $G_x$—X independently, when the radical of a metallized coupling component, is the metallized radical of a coupling component of the formula

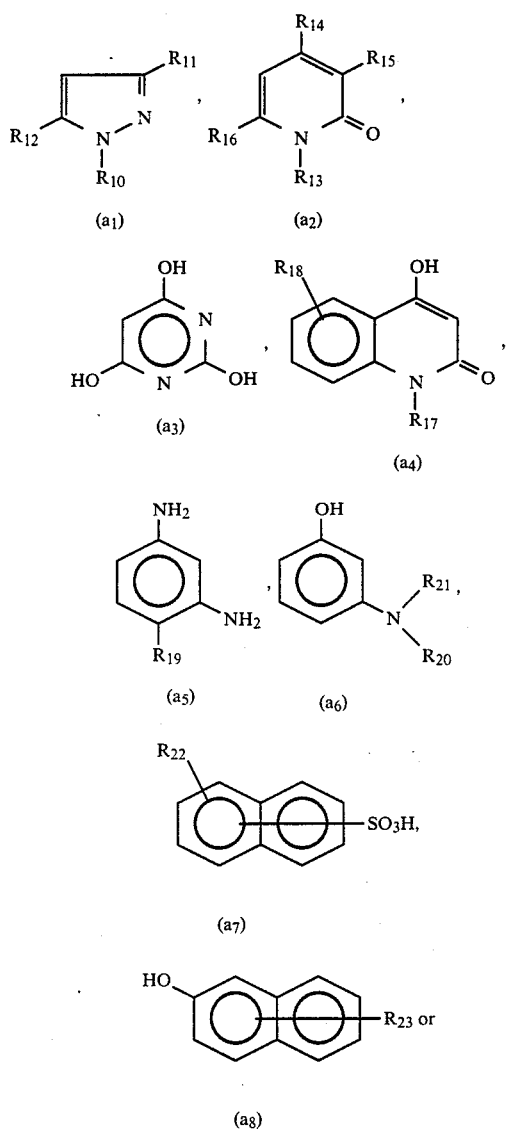

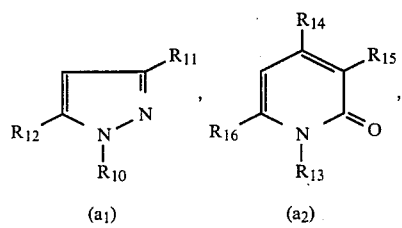

wherein each of $R_{10}$–$R_{25}$ is as defined above.

16. A 1:2 metal complex according to claim 15, or a salt thereof each cation of which is non-chromophoric, wherein
each B independently, when the radical of a non-metallized coupling component, is the radical of a coupling component of the formula

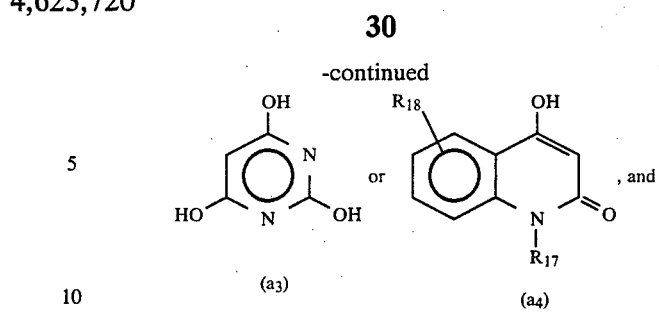

each $G_x$—X independently, when the radical of a matallized coupling component, is the metallized radical of a coupling component of the formula

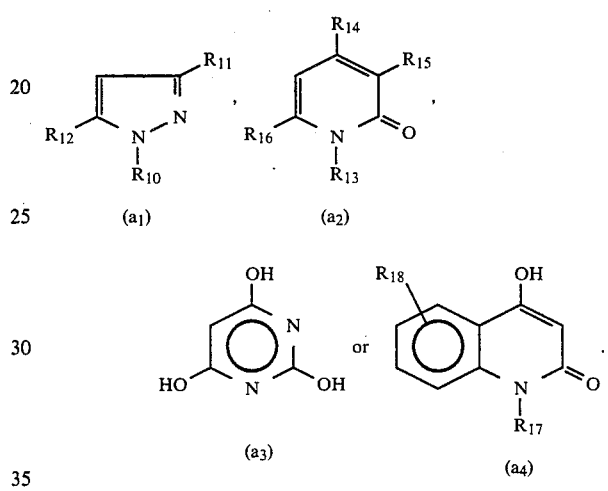

17. A 1:2 metal complex according to claim 15, or a salt thereof each cation of which is non-chromophoric, wherein
each B independently, when the radical of a non-metallized coupling component, is the radical of a coupling component of the formula

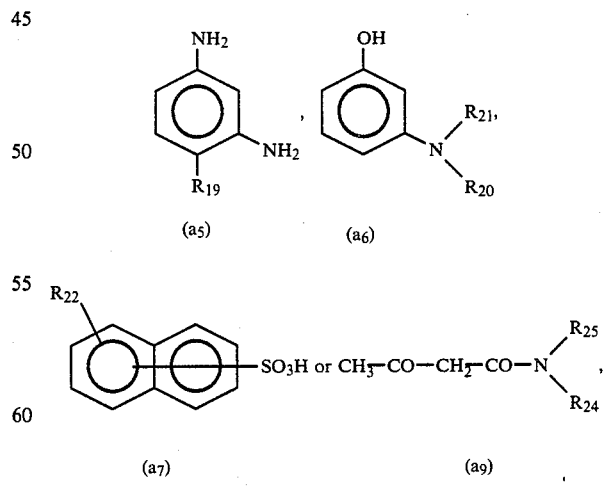

and
each $G_x$—X independently, when the radical of a metallized coupling component, is the radical of a metallized coupling component of the formula

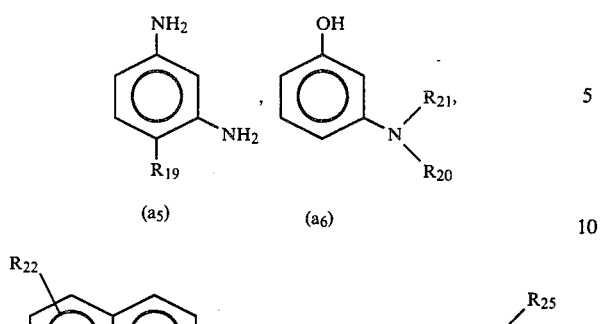

(a5)  (a6)

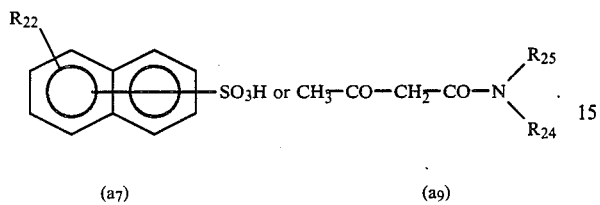

(a7)  (a9)

18. A 1:2 metal complex according to claim 15, or a salt thereof each cation of which is non-chromophoric, wherein each B is independently the radical of a non-metallized coupling component of the formula

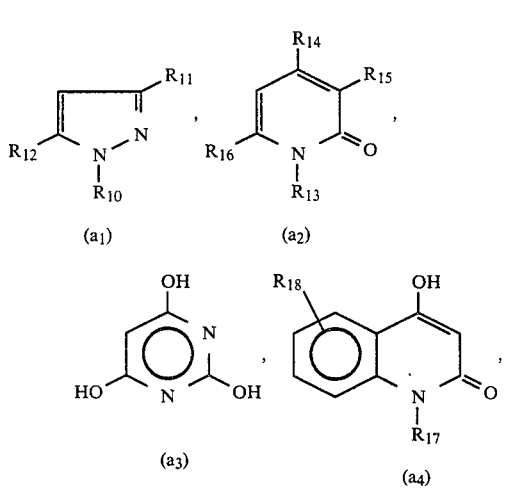

(a1)  (a2)

(a3)  (a4)

(a5)  (a6)

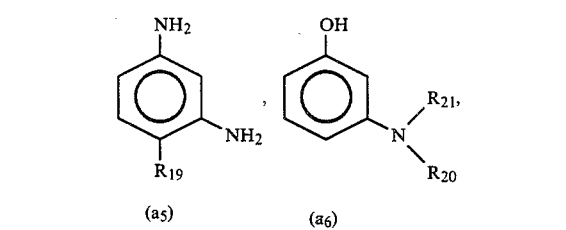

(a7)  (a8)

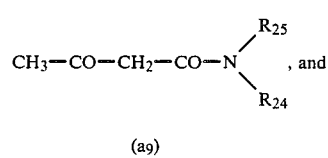

(a9)

each $G_x$—X is independently the metallized radical of a coupling component of the formula

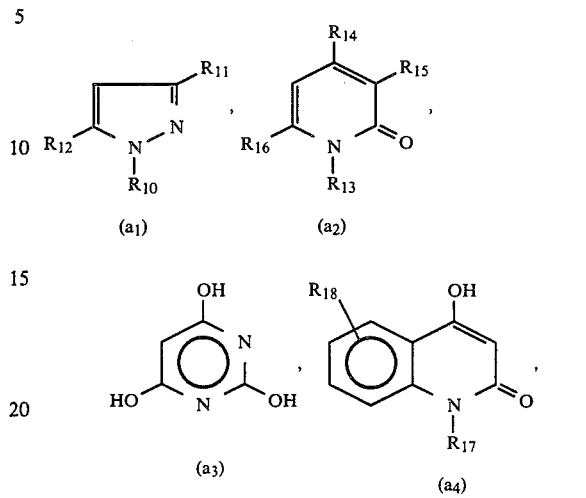

(a1)  (a2)

(a3)  (a4)

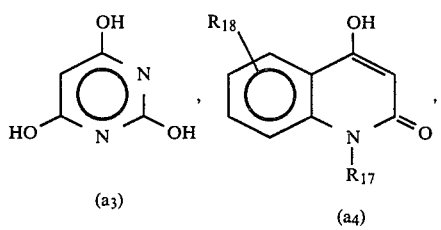

(a5)  (a6)

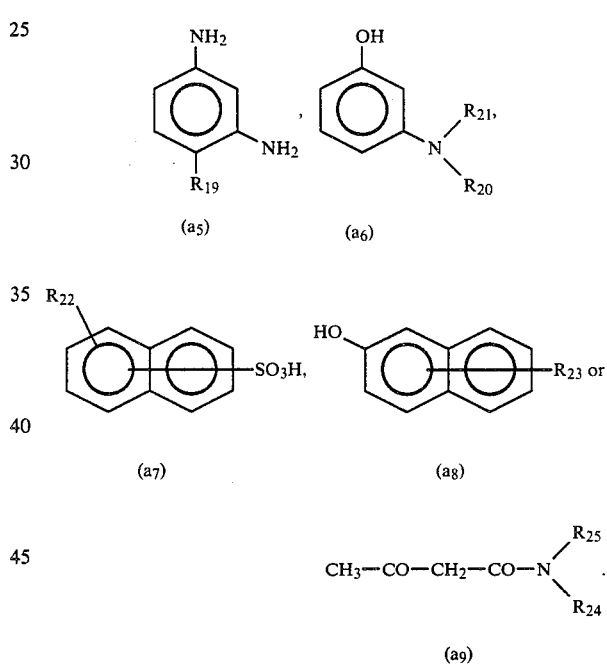

(a7)  (a8)

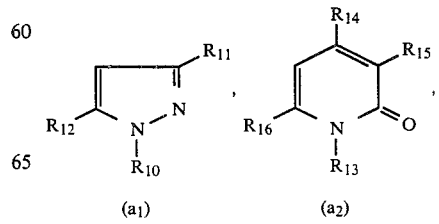

(a9)

19. A 1:2 metal complex according to claim 18, or a salt thereof each cation of which is non-chromophoric, wherein each B is independently the radical of a non-metallized coupling component of the formula

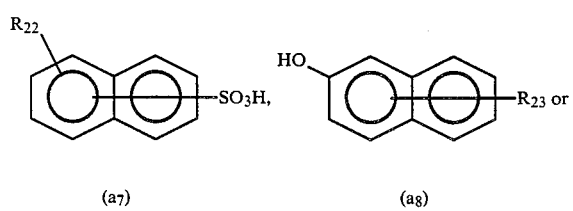

(a1)  (a2)

-continued

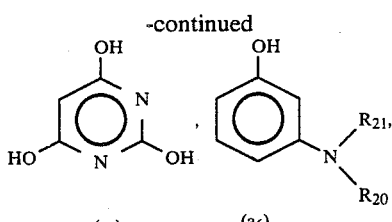

(a₃)    (a₆)

(a₇)

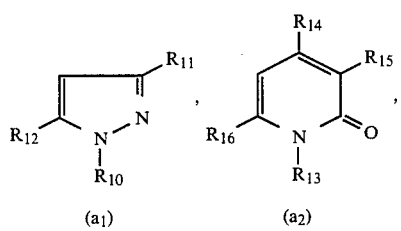

(a₈)

each $G_x$—X is independently the metallized radical of a coupling component of the formula

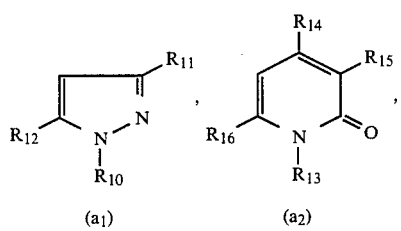

(a₁)    (a₂)

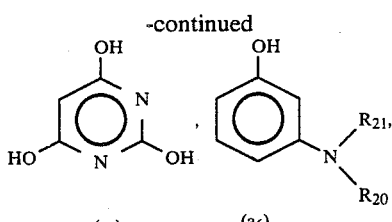

(a₃)    (a₆)

(a₇)

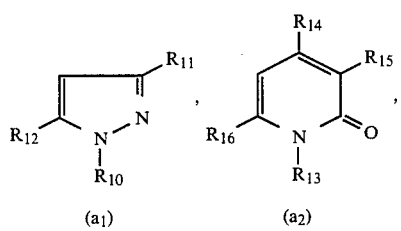

(a₈)

20. A 1:2 metal complex according to claim 19, or a salt thereof each cation of which is non-chromophoric, wherein
  each B is independently the radical of a non-metallized coupling component of the formula

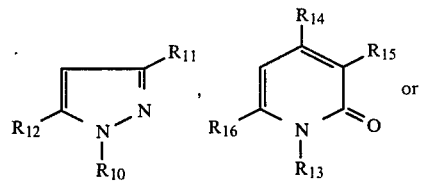

(a₁)    (a₂)

(a₇)

each $G_x$—X is independently the metallized radical of a coupling component of the formula

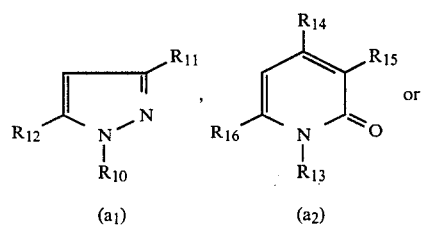

(a₁)    (a₂)

(a₇)

21. A 1:2 metal complex according to claim 20, or a salt thereof each cation of which is non-chromophoric, wherein
  each $R_{10}$ is independently

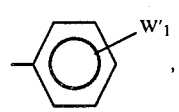

wherein $W'_1$ is hydrogen or sulfo,
each $R_{11}$ is independently methyl or carboxy,
each $R_{12}$ is hydroxy,
each $R_{13}$ is independently hydrogen, $C_{1-4}$alkyl, cyclohexyl or

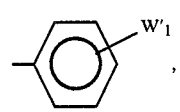

wherein $W'_1$ is hydrogen or sulfo,
each $R_{14}$ is methyl,
each $R_{15}$ is cyano,
each $R_{16}$ is hydroxy, and
each $R_{22}$ is hydroxy, with the proviso that $R_{22}$ and the sulfo group attached to the same ring are not ortho to each other.

22. A 1:2 metal complex according to claim 20, or a salt thereof each cation of which is non-chromophoric, wherein each B is independently the radical of a non-metallized coupling compound of the formula

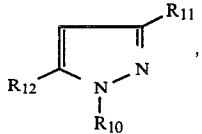 (a₁)

and each $G_x$—X is independently the metallized radical of a coupling component of the formula

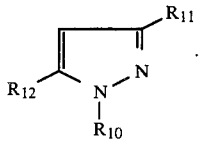

23. A 1:2 metal complex according to claim 20, or a salt thereof each cation of which is non-chromophoric, wherein each $R_1$ is independently hydrogen, methyl or ethyl,
each $R_3$ independently is hydrogen, chloro, $C_{1-4}$alkyl or sulfo when the T attached to the same ring is —$N(R_1)SO_2$— and is hydrogen, chloro or $C_{1-4}$alkyl when the T attached to the same ring is —$SO_2N(R_1)$—,
each $R_4$ is hydrogen, and
each $R_5$ independently is hydrogen, chloro or $C_{1-4}$alkyl when the T attached to the same ring is —$N(R_1)SO_2$— and is hydrogen, chloro, $C_{1-4}$alkyl or sulfo when the T attached to the same ring is —$SO_2N(R_1)$—.

24. A 1:2 metal complex according to claim 23, or a salt thereof each cation of which is non-chromophoric, wherein each T is independently —$SO_2N(R_1)$—,
each X is —O—, and
each Y is —O—.

25. A 1:2 metal complex according to claim 23, or a salt thereof each cation of which is non-chromophoric, wherein each $R_3$ is hydrogen,
each $R_5$ is hydrogen, and
each T is —$SO_2NH$—.

26. A 1:2 metal complex according to claim 8, or a salt thereof each cation of which is non-chromophoric, wherein each B independently, when the radical of a non-metallized diazo component, is

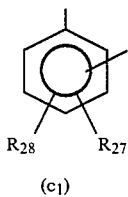 , 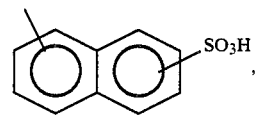

(c₁)        (c₂)

-continued

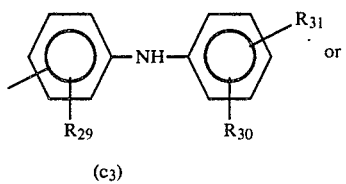 or (c₃)

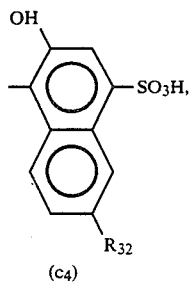

(c₄)

wherein $R_{26}$ is hydrogen, methoxy, carboxy or hydroxy,
$R_{27}$ is hydrogen, chloro, methyl, methoxy, nitro or sulfo,
$R_{28}$ is hydrogen, chloro, methyl, cyano, carboxy, nitro, sulfo, —$SO_2NW_3W_4$ or acetamido,
wherein each of $W_3$ and $W_4$ is independently hydrogen, $C_{1-4}$alkyl or $C_{2-4}$alkyl substituted in the 2-, 3- or 4-position by hydroxy or $C_{1-4}$alkoxy,
$R_{29}$ is hydrogen, chloro, methyl, methoxy or sulfo,
$R_{30}$ is hydrogen or nitro,
$R_{31}$ is hydrogen, nitro or sulfo, and
$R_{32}$ is hydrogen or nitro,
each $G_x$—X, independently, when the radical of a metallized diazo component, is

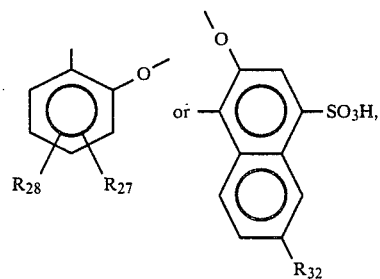

wherein $R_{27}$, $R_{28}$ and $R_{32}$ are as defined above,
each B independently, when the radical of a non-metallized coupling component, is the radical of a coupling component of the formula

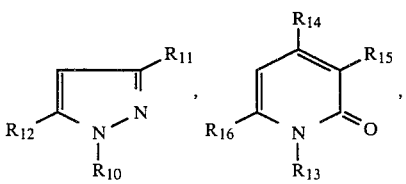 , 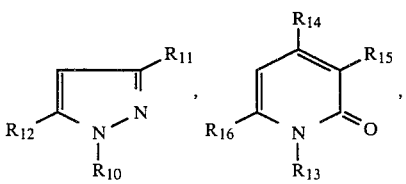

(a₁)        (a₂)

-continued

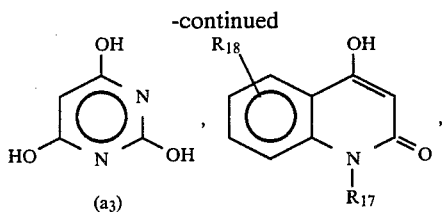

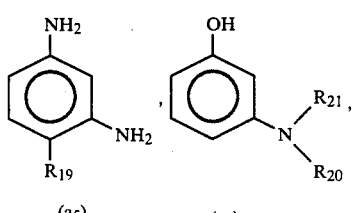

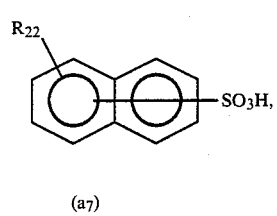

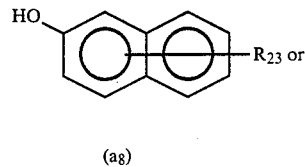

wherein $R_{10}$ is hydrogen,

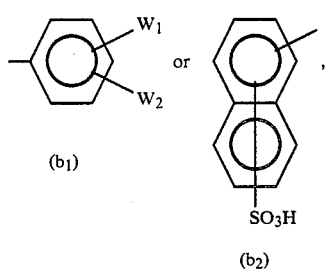

wherein $W_1$ is hydrogen, chloro, methyl, methoxy, cyano, nitro, carboxy, —$SO_2NW_3W_4$ or sulfo, wherein $W_3$ and $W_4$ are as defined above, and
$W_2$ is hydrogen, chloro, methyl, methoxy or carboxy,
$R_{11}$ is $C_{1-4}$alkyl, phenyl, carboxy or —$CONW_3W_4$, wherein $W_3$ and $W_4$ are as defined above,
$R_{12}$ is —OH or —$NH_2$,
$R_{13}$ is hydrogen; —$NH_2$; phenylamino; $C_{1-8}$alkyl; $C_{6-9}$cycloalkyl; cycloalkyl substituted by 1, 2 or 3 alkyl groups, the total number of carbon atoms therein being 6 to 9, inclusive; carboxy($C_{1-4}$alkyl); $C_{2-4}$alkyl substituted in the 2-, 3- or 4-position by hydroxy, methoxy, ethoxy, chloro or sulfo;

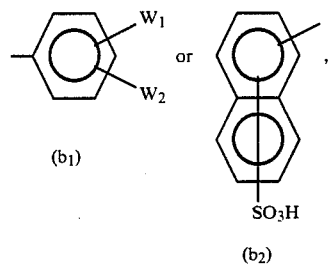

wherein $W_1$ and $W_2$ are as defined above,
$R_{14}$ is hydrogen, hydroxy, methyl, carboxy, phenyl or —$CH_2$—$SO_3H$,
$R_{15}$ is hydrogen, carboxy, sulfo, acetyl or cyano,
$R_{16}$ is hydrogen, hydroxy or methyl, with the proviso that at least one of $R_{14}$ and $R_{16}$ is hydroxy,
$R_{17}$ is hydrogen or $C_{1-4}$alkyl,
$R_{18}$ is hydrogen or chloro,
$R_{19}$ is hydrogen, methyl, methoxy, chloro, carboxy or sulfo,
each of $R_{20}$ and $R_{21}$ is independently hydrogen, $C_{1-4}$alkyl, carboxymethyl, 2-carboxyethyl or 2-hydroxyethyl,
$R_{22}$ is —OH or —$NH_2$,
$R_{23}$ is hydrogen or carboxy,
$R_{24}$ is hydrogen or $C_{1-4}$alkyl, and
$R_{25}$ is $C_{1-8}$alkyl; $C_{6-9}$cycloalkyl; cycloalkyl substituted by 1, 2 or 3 alkyl groups, the total number of carbon atoms therein being 6 to 9, inclusive;

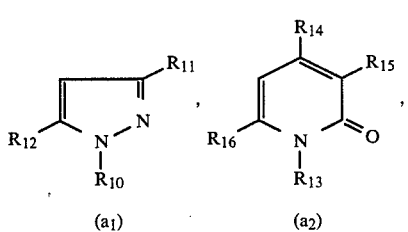

wherein $W_1$ and $W_2$ are as defined above, and each $G_x$—X independently, when the radical of a metallized coupling component, is the metallized radical of a coupling component of the formula

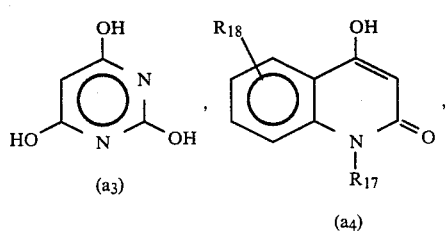

(a5): benzene with NH2, NH2, R19 substituents (a6): phenol with N(R21)(R20) substituent (a7): naphthalene with R22 and SO3H (a8): naphthalene with HO and R23

$$CH_3-CO-CH_2-CO-N\binom{R_{25}}{R_{24}}$$ (a9)

wherein each of $R_{10}$–$R_{25}$ is as defined above.

27. A 1:2 metal complex according to claim 26, or a salt thereof each cation of which is non-chromophoric, wherein $Me_2$ is iron, chromium or cobalt.

28. A 1:2 metal complex according to claim 27, or a salt thereof each cation of which is non-chromophoric, wherein each water-solubilizing group is sulfo or carboxy.

29. A 1:2 metal complex according to claim 27, or a salt thereof each cation of which is non-chromophoric, with the proviso that the complex contains at least one sulfo group.

30. A 1:2 metal complex according to claim 29, or a salt thereof each cation of which is non-chromophoric, with the proviso that each azo unit of the complex independently contains 1 or 2 sulfo groups.

31. A 1:2 metal complex according to claim 26, or a salt thereof each cation of which is non-chromophoric, wherein (i) at least one B is the radical of a coupling component of the pyrazole structure (a1) with $R_{11}$, $R_{12}$, $R_{10}$ (ii) at least one $G_x$—X is the metallized radical of a coupling component of the formula pyrazole structure (a1) with $R_{11}$, $R_{12}$, $R_{10}$ or (iii) both (i) and (ii).

32. A 1:2 metal complex according to claim 26, or a salt thereof each cation of which is non-chromophoric, wherein
each $R_3$ is hydrogen,
each $R_4$ is hydrogen,
each $R_5$ is hydrogen, and
$Me_2$ is iron, chromium or cobalt,
with the proviso that when a T is —$SO_2N(R_1)$—, the B of the B—N=N— group attached to the same ring is the radical of a non-metallized coupling component.

33. A 1:2 metal complex according to claim 26, or a salt thereof each cation of which is non-chromophoric, wherein
each $R_1$ is independently hydrogen, methyl or ethyl,
each $R_3$ is independently hydrogen, chloro, $C_{1-4}$alkyl or sulfo when the T attached to the same ring is —$N(R_1)SO_2$— and the $G_x$—X of the $G_x$—X—N=N— group attached to the same ring is the radical of a metallized coupling component and otherwise is hydrogen, chloro or $C_{1-4}$alkyl,
each $R_4$ is hydrogen,
each $R_5$ is independently hydrogen, chloro, $C_{1-4}$alkyl or sulfo when the T attached to the same ring is —$SO_2N(R_1)$— and the B of the B—N=N— group attached to the same ring is the radical of a non-metallized coupling component and otherwise is hydrogen, chloro or $C_{1-4}$alkyl,
each $R_{10}$ is independently phenyl with $W'_1$ substituent, wherein $W'_1$ is hydrogen or sulfo,
each $R_{11}$ is independently methyl or carboxy,
each $R_{12}$ is hydroxy,
each $R_{13}$ is independently hydrogen, $C_{1-4}$alkyl, cyclohexyl or phenyl with $W'_1$ substituent, wherein $W'_1$ is hydrogen or sulfo,
each $R_{14}$ is methyl,
each $R_{15}$ is cyano,
each $R_{16}$ is hydroxy,
each $R_{17}$ is hydrogen,
each $R_{18}$ is hydrogen,
each $R_{19}$ is independently methyl or sulfo,
each $R_{20}$ and $R_{21}$ are independently carboxymethyl, 2-carboxyethyl or 2-hydroxyethyl, with the proviso that the $R_{20}$ and $R_{21}$ attached to a nitrogen atom are the same,
each $R_{22}$ is hydroxy, each $R_{23}$ is hydrogen,
each $R_{24}$ is hydrogen,
each $R_{25}$ is independently

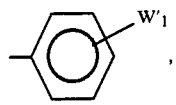

wherein $W_1'$ is hydrogen or sulfo,
each $R_{26}$ is independently hydrogen or hydroxy,
each $R_{27}$ is independently hydrogen, nitro or sulfo,
each $R_{28}$ is independently hydrogen, chloro, methyl, carboxy or nitro,
each $R_{29}$ is independently hydrogen, methyl or sulfo,
each $R_{30}$ is independently hydrogen or nitro, with the proviso that $R_{30}$ is nitro when the $R_{29}$ of the same B is hydrogen,
each $R_{31}$ is independently hydrogen, nitro or sulfo, with the proviso that $R_{31}$ is nitro or sulfo when the $R_{29}$ of the same B is hydrogen and is hydrogen or nitro when the $R_{29}$ of the same B is sulfo,
each $R_{32}$ is nitro, and
$Me_2$ is iron, chromium or cobalt,
with the provisos that (i) each T is independently meta or para to the B—N=N— group attached to the same ring, (ii) each T is independently meta or para to the $G_x$—X—N=N— group attached to the same ring, and (iii) when a T is —SO$_2$N(R$_1$)—, the B of the B—N=N— group attached to the same ring is the radical of a non-metallized coupling component.

34. A mixture of symmetric and asymmetric 1:2 cobalt or chromium complexes according to claim 8.

35. A 1:2 metal complex according to claim 29, or a salt thereof each cation of which is non-chromophoric, wherein
each $R_3$ is hydrogen,
each $R_4$ is hydrogen, and
each $R_5$ is hydrogen,
with the provisos that (i) when a T is —SO$_2$N(R$_1$)—, the B of the B—N=N— group attached to the same ring is the radical of a non-metallized coupling component, and (ii) each azo unit of the complex independently contains 1, 2 or 3 sulfo groups.

36. A 1:2 metal complex according to claim 35, or a salt thereof each cation of which is non-chromophoric, wherein
each B independently, when the radical of a non-metallized coupling component, is the radical of a coupling component of the formula

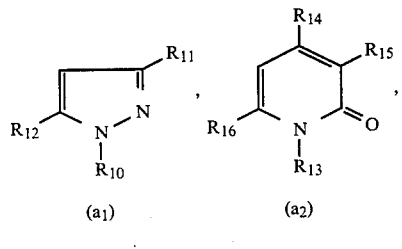

-continued

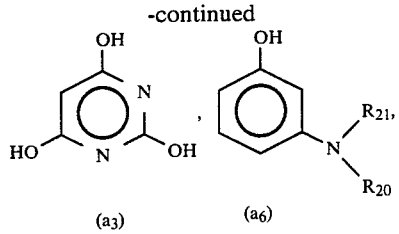

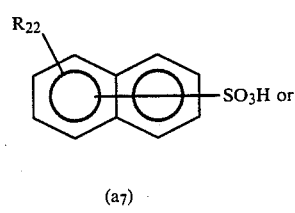

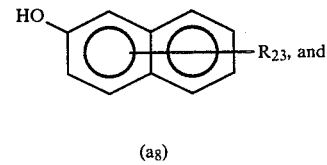

each $G_x$—X independently, when the radical of a metallized coupling component, is the metallized radical of a coupling component of the formula

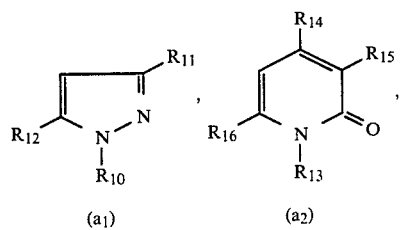

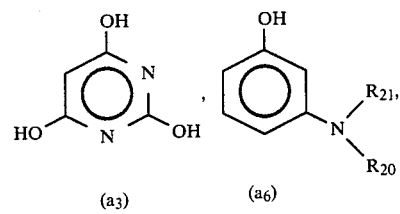

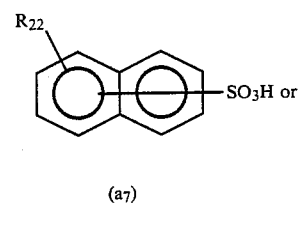

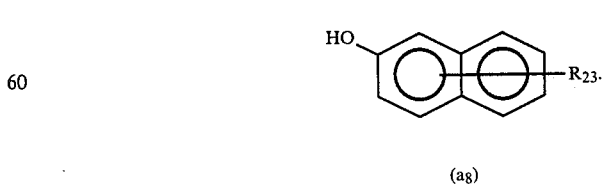

37. A 1:2 metal complex according to claim 36, or a salt thereof each cation of which is non-chromophoric, wherein each B is independently the radical of a coupling component of the formula

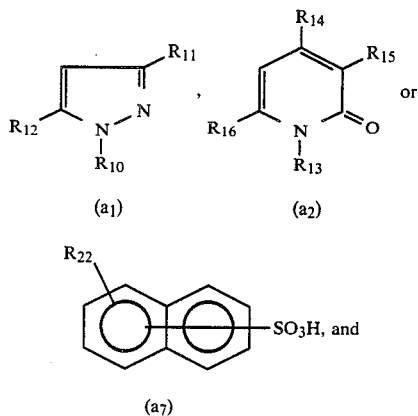

(a₁)        (a₂)

(a₇)

each $G_x$—X is independently the metallized radical of a coupling component of the formula

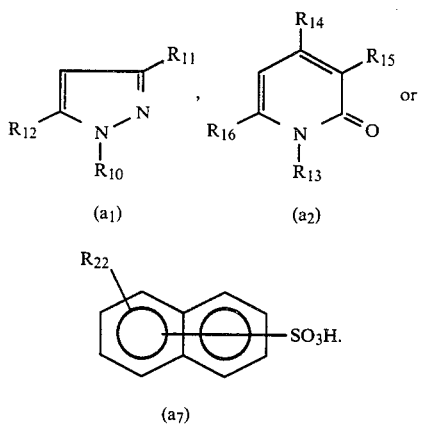

(a₁)        (a₂)

(a₇)

38. A 1:2 metal complex according to claim 37, or a salt thereof each cation of which is non-chromophoric, wherein
each $R_{10}$ is independently

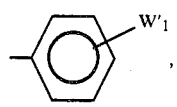

wherein $W_1'$ is hydrogen or sulfo,
each $R_{11}$ is independently methyl or carboxy,
each $R_{12}$ is hydroxy,
each $R_{13}$ is independently hydrogen, $C_{1-4}$alkyl, cyclohexyl or

wherein $W_1'$ is hydrogen or sulfo,
each $R_{14}$ is methyl,
each $R_{15}$ is cyano,
each $R_{16}$ is hydroxy, and
each $R_{22}$ is hydroxy, with the proviso that $R_{22}$ and the sulfo group attached to the same ring are not ortho to each other.

39. A 1:2 metal complex according to claim 38, or an ammonium or alkali metal salt thereof.

40. A 1:2 metal complex according to claim 39, or a lithium, sodium or potassium salt thereof.

41. A 1:2 metal complex according to claim 33, or a salt thereof each cation of which is non-chromophoric, wherein
each $R_3$ is hydrogen, and
each $R_5$ is hydrogen.

42. A 1:2 metal complex according to claim 41, or an ammonium or alkali metal salt thereof.

43. A 1:2 metal complex according to claim 42, or a lithium, sodium or potassium salt thereof.

44. A 1:2 metal complex according to claim 30, or an ammonium or alkali metal salt thereof.

45. A 1:2 metal complex according to claim 44, or a lithium, sodium or potassium salt thereof.

46. A 1:2 metal complex according to claim 30, or a salt thereof each cation of which is non-chromophoric, wherein
each $R_{13}$ is independently hydrogen; —NH₂; phenylamino; $C_{1-8}$alkyl; $C_{6-9}$cycloalkyl; carboxy($C_{1-4}$alkyl); $C_{2-4}$alkyl substituted in the 2-, 3- or 4-position by hydroxy, methoxy, ethoxy, chloro or sulfo;

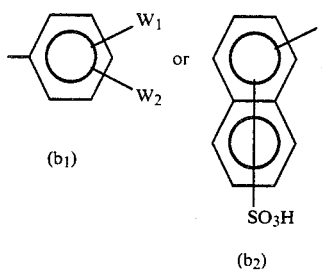

(b₁)

(b₂)

wherein $W_1$ is hydrogen, chloro, methyl, methoxy, cyano, nitro, carboxy, —SO₂NW₃W₄ or sulfo,
wherein each of $W_3$ and $W_4$ is independently hydrogen, $C_{1-4}$alkyl or $C_{2-4}$alkyl substituted in the 2-, 3- or 4-position by hydroxy or $C_{1-4}$alkoxy, and
$W_2$ is hydrogen, chloro, methyl, methoxy or carboxy, and
each $R_{25}$ is independently $C_{1-8}$alkyl, $C_{6-9}$cycloalkyl,

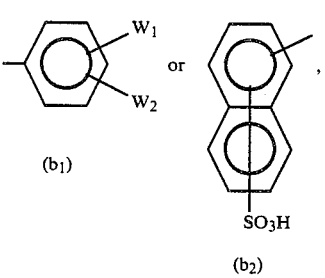

(b₁)

(b₂)

wherein $W_1$ and $W_2$ are as defined above.

47. A 1:2 metal complex according to claim 46, or a salt thereof each cation of which is non-chromophoric, with the provisos that (i) each T is independently meta or para to the B—N═N— group attached to the same ring, and (ii) each T is independently meta or para to the ($G_x$—X)—N═N— group attached to the same ring.

48. A 1:2 metal complex according to claim 47, or a salt thereof each cation of which is non-chromophoric, wherein
each $R_1$ is independently hydrogen, methyl or ethyl,
each $R_3$ is hydrogen,
each $R_4$ is hydrogen, and
each $R_5$ is hydrogen,
with the proviso that when a T is —SO$_2$N(R$_1$)—, the B of the B—N=N— group attached to the same ring is the radical of a non-metallized coupling component.

49. A 1:2 metal complex according to claim 48, or an ammonium or alkali metal salt thereof.

50. A 1:2 metal complex according to claim 49, or a lithium, sodium or potassium salt thereof.

51. The 1:2 metal complex according to claim 33 having the formula

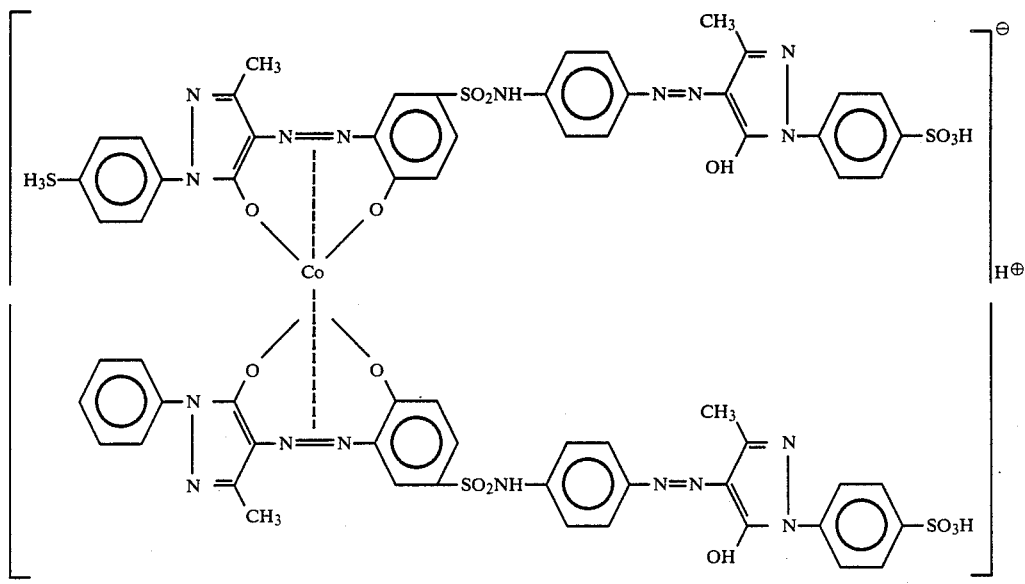

or a salt thereof each cation of which is non-chromophoric.

52. A sodium salt of the 1:2 metal complex according to claim 51.

* * * * *